(12) United States Patent
Xu et al.

(10) Patent No.: US 12,542,115 B2
(45) Date of Patent: Feb. 3, 2026

(54) MIRRORING METHOD, APPARATUS, AND SYSTEM

(71) Applicant: HUAWEI TECHNOLOGIES CO., LTD., Guangdong (CN)

(72) Inventors: Hui Xu, Shenzhen (CN); Ziran Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 230 days.

(21) Appl. No.: 18/247,426

(22) PCT Filed: Sep. 29, 2021

(86) PCT No.: PCT/CN2021/121746
§ 371 (c)(1),
(2) Date: Mar. 30, 2023

(87) PCT Pub. No.: WO2022/068882
PCT Pub. Date: Apr. 7, 2022

(65) Prior Publication Data
US 2024/0005891 A1   Jan. 4, 2024

(30) Foreign Application Priority Data
Sep. 30, 2020   (CN) .......................... 202011066155.7

(51) Int. Cl.
*G09G 5/02* (2006.01)
*G06F 3/14* (2006.01)
*H04N 9/64* (2023.01)

(52) U.S. Cl.
CPC ............. *G09G 5/02* (2013.01); *G06F 3/1454* (2013.01); *H04N 9/64* (2013.01);
(Continued)

(58) Field of Classification Search
CPC .. G09G 5/02; G09G 2340/06; G09G 2370/04; G09G 2370/16; G06F 3/1454; H04N 9/3182
See application file for complete search history.

(56) References Cited

U.S. PATENT DOCUMENTS

2016/0239091 A1*  8/2016  Forutanpour ......... G06F 1/1641
2019/0080674 A1   3/2019  Wyman et al.
2021/0210048 A1*  7/2021  Bonnet .................... G09G 5/02

FOREIGN PATENT DOCUMENTS

| CN | 106095084 A | 11/2016 |
|----|-------------|---------|
| CN | 110381345 A | 10/2019 |

(Continued)

*Primary Examiner* — Antonio A Caschera

(57) ABSTRACT

This application provides a mirroring method, an apparatus, and a system. In the method, in a process in which an electronic device such as a mobile phone or a tablet and a large-screen device share an image resource through mirroring, a color gamut of a collected image resource may be converted into a color gamut obtained through negotiation between the electronic device and the large-screen device, the converted image resource may be sent to the large-screen device, and the large-screen device displays the image resource in the negotiated color gamut. According to the technical solutions provided in this application, the large-screen device may use a dynamic adaptive optimal color gamut during mirroring, that is, a color difference between the image resource displayed on the electronic device and the large-screen device may be reduced in the mirroring process. This improves users' visual experience during mirroring.

24 Claims, 26 Drawing Sheets

(52) U.S. Cl.
CPC ..... *G09G 2340/06* (2013.01); *G09G 2370/04* (2013.01); *G09G 2370/16* (2013.01)

(56) References Cited

FOREIGN PATENT DOCUMENTS

| | | | | |
|---|---|---|---|---|
| CN | 110389696 | A | 10/2019 | |
| CN | 111294649 | A | 6/2020 | |
| EP | 3697073 | A1 * | 8/2020 | ............ G06T 11/40 |
| KR | 20160066929 | A | 6/2016 | |
| WO | 2019002559 | A1 | 1/2019 | |

\* cited by examiner

MIRRORING METHOD, APPARATUS, AND SYSTEM

CROSS-REFERENCE TO RELATED APPLICATIONS

This application is a U.S. national stage of International Application No. PCT/CN2021/121746 filed on Sep. 29, 2021, which claims priority to Chinese Patent Application No. 202011066155.7 filed on Sep. 30, 2020. Both of the aforementioned applications are hereby incorporated by reference in their entireties.

TECHNICAL FIELD

Embodiments of this application relate to wireless display technologies, and in particular, to a mirroring method, an apparatus, and a system.

BACKGROUND

By using a mirroring technology, an image resource displayed on an electronic device such as a mobile phone and a tablet may be shared to a large-screen device such as a television and a smart screen. The mirroring technology (mirroring technology) includes a plurality of technology types, such as miracast, airplay, a private mirroring technology, and the like. By using the mirroring technology, the electronic device directly encodes the image resource and transmits the encoded image resource to the large-screen device, and the large-screen device does not need to access a network. This is simple and fast.

How to reduce a difference between image resources displayed on the large-screen device and the electronic device in a mirroring process and improve users' mirroring experience is a current and future research direction.

SUMMARY

This application provides a mirroring method, an apparatus, and a system, to reduce a color difference between image resources displayed on an electronic device and a large-screen device during mirroring, and improve users' visual experience in the mirroring process.

According to a first aspect, an embodiment of this application provides a mirroring method. The method is applied to a communication system including an electronic device and a large-screen device. The method includes: The electronic device establishes a communication connection to the large-screen device; the electronic device negotiates with the large-screen device about a first color gamut over the communication connection, where the first color gamut is a color gamut with a widest coloring range and supported by both the electronic device and the large-screen device; the electronic device collects an image resource, where the image resource includes a first image resource in a second color gamut, where the first image resource is provided by a first application running on the electronic device; the electronic device converts the first image resource from the second color gamut to the first color gamut; the electronic device sends the first image resource in the first color gamut to the large-screen device; and the large-screen device displays the first image resource in the first color gamut.

According to the method provided in the first aspect, a large-screen device end may use a dynamic adaptive optimal color gamut in a mirroring process, that is, a color difference between the image resources displayed on the electronic device and the large-screen device may be reduced in the mirroring process. This improves users' visual experience during mirroring.

With reference to the first aspect, the communication connection established between the electronic device and the large-screen device may include but is not limited to: a wireless fidelity direct (wireless fidelity direct, Wi-Fi direct) (also referred to as a wireless fidelity peer-to-peer (wireless fidelity peer-to-peer, Wi-Fi P2P)) communication connection, a Bluetooth communication connection, a near field communication (near field communication, NFC) connection, and the like.

With reference to the first aspect, in an implementation, after the electronic device establishes the communication connection to the large-screen device, and before the electronic device converts the first image resource from the second color gamut to the first color gamut, the method further includes: The electronic device displays prompt information and a first control, where the prompt information prompts a user whether to use the first color gamut for mirroring. The electronic device detects a first operation performed on the first control, and in response to the first operation, converts the first image resource from the second color gamut to the first color gamut. In this way, the user may independently choose whether to use the first color gamut for mirroring, providing the user with flexible options.

With reference to the first aspect, in an implementation, the image resource collected by the electronic device further includes a second image resource in a third color gamut, where the second image resource is provided by a second application running on the electronic device, for example, in a split screen scenario. Before the electronic device sends the first image resource to the large-screen device, the method further includes: The electronic device converts the second image resource from the third color gamut to the first color gamut. The electronic device synthesizes the first image resource in the first color gamut with the second image resource in the first color gamut, and sends a synthesized resource to the large-screen device. The large-screen device further displays the second image resource in the first color gamut. In this way, in the split screen scenario of the electronic device, all image resources from different applications may be converted into the first color gamut, and then sent to the large-screen device for displaying.

With reference to the first aspect, in an implementation, the image resource collected by the electronic device further includes a second image resource in a third color gamut, where the second image resource is provided by a second application running on the electronic device, for example, in a split screen scenario. After the electronic device synthesizes the first image resource in the first color gamut with the second image resource of the third color gamut, and sends a synthesized resource to the large-screen device, the large-screen device displays the second image resource in the third color gamut. In this way, in the split screen scenario of the electronic device, a part of image resources from some applications may be converted into image resources in the first color gamut, and a color gamut of the image resource from another application is not converted. In this way, power consumption of the electronic device may be reduced.

The some applications may be set by default by the electronic device, or may be set by the user, or may be selected by the user.

For example, in an implementation, before the electronic device converts the first image resource from the second color gamut to the first color gamut, the method further includes: The electronic device displays a second control and a third control, where the second control corresponds to the first image resource, and the third control corresponds to the second image resource; and the electronic device detects a second operation performed on the second control, and in response to the second operation, converts the first image resource from the second color gamut to the first color gamut. This gives the user flexible options, and improves user experience.

With reference to the first aspect, in an implementation, the electronic device sends the first image resource in the first color gamut and the first color gamut to the large-screen device. This ensures that the large-screen device learns of the negotiated first color gamut.

With reference to the first aspect, in an implementation, the large-screen device displays the first image resource on an entire display, or the large-screen device displays the first image resource on a part of a display.

With reference to the first aspect, in an implementation, that the electronic device negotiates with the large-screen device about a first color gamut over the communication connection may be:

the electronic device sends a first message to the large-screen device over the communication connection, where the first message is used to query a color gamut supported by the large-screen device;

the large-screen device sends a second message to the electronic device, where the second message carries the color gamut supported by the large-screen device; and the electronic device determines the first color gamut based on a color gamut supported by the electronic device and the color gamut supported by the large-screen device.

In an implementation, a command in an existing RTSP protocol may be extended, to add a colormode (colormode) field for carrying a color gamut supported by the large-screen device in the second message.

With reference to the first aspect, in an implementation, after the electronic device determines the first color gamut, the method further includes: The electronic device sends a third message to the large-screen device, where the third message carries the first color gamut. This ensures that the large-screen device learns of the negotiated first color gamut.

With reference to the first aspect, in an implementation, the electronic device encodes the first image resource in the first color gamut to obtain a transport stream, and sends the transport stream to the large-screen device. The large-screen device decodes the transport stream to obtain the first image resource in the first color gamut, and displays the first image resource in the first color gamut.

With reference to the first aspect, in an implementation, a coloring range of the first color gamut is greater than a coloring range of the second color gamut.

According to a second aspect, an embodiment of this application provides a mirroring method, applied to an electronic device. The method includes: The electronic device establishes a communication connection to a large-screen device; the electronic device negotiates with the large-screen device about a first color gamut over the communication connection, where the first color gamut is a color gamut with a widest coloring range and supported by both the electronic device and the large-screen device; the electronic device collects an image resource, where the image resource includes a first image resource in a second color gamut, and the first image resource is provided by a first application running on the electronic device; the electronic device converts the first image resource from the second color gamut to the first color gamut; and the electronic device sends the first image resource in the first color gamut to the large-screen device.

For the method performed by the electronic device in the second aspect, refer to the method performed on the electronic device side in the first aspect and related descriptions.

According to a third aspect, an embodiment of this application provides a mirroring method, applied to a large-screen device. The method includes: The large-screen device establishes a communication connection to an electronic device; the large-screen device negotiates with the electronic device about a first color gamut over the communication connection, where the first color gamut is a color gamut with a widest coloring range and supported by both the electronic device and the large-screen device; and the large-screen device receives a first image resource in the first color gamut and sent by the electronic device, and displays the first image resource in the first color gamut.

For the method performed by the large-screen device in the third aspect, refer to the method performed on the large-screen device side in the first aspect and related descriptions.

According to a fourth aspect, an embodiment of this application provides an electronic device. The electronic device includes one or more processors and one or more memories. The one or more memories are coupled to the one or more processors, and configured to store computer program code. The computer program code includes computer instructions. When the one or more processors execute the computer instructions, the electronic device is enabled to perform the method described in any one of the second aspect or the implementations of the second aspect.

According to a fifth aspect, an embodiment of this application provides a large-screen device. The large-screen device includes one or more processors and one or more memories. The one or more memories are coupled to the one or more processors, and configured to store computer program code. The computer program code includes computer instructions. When the one or more processors execute the computer instructions, the large-screen device is enabled to perform the method described in any one of the third aspect or the implementations of the third aspect.

According to a sixth aspect, an embodiment of this application provides a computer program product including instructions. When the computer program product runs on an electronic device, the electronic device is enabled to perform the method described in any one of the second aspect or the implementations of the second aspect.

According to a seventh aspect, an embodiment of this application provides a computer-readable storage medium, including instructions. When the instructions are run on an electronic device, the electronic device is enabled to perform the method described in any one of the second aspect or the implementations of the second aspect.

According to an eighth aspect, an embodiment of this application provides a computer program product including instructions. When the computer program product runs on an electronic device, the electronic device is enabled to perform the method described in any one of the third aspect or the implementations of the third aspect.

According to a ninth aspect, an embodiment of this application provides a computer-readable storage medium, including instructions. When the instructions are run on an electronic device, the electronic device is enabled to perform the method described in any one of the third aspect or the implementations of the third aspect.

According to a tenth aspect, an embodiment of this application provides a communication system. The communication system includes an electronic device and a large-screen device. The electronic device is the electronic device described in the fourth aspect, and the large-screen device is the electronic device described in the fifth aspect.

According to the technical solutions provided in embodiments of this application, in a process in which the electronic device such as a mobile phone or a tablet and the large-screen device share an image resource through mirroring, the electronic device negotiates with the large-screen device about a color gamut used during mirroring. Then, the electronic device converts a color gamut of a collected image resource into the color gamut, and sends a converted image resource to the large-screen device. After receiving the image resource, the large-screen device displays the image resource in the negotiated color gamut. According to the technical solutions, the large-screen device end may use a dynamic adaptive optimal color gamut during mirroring, that is, a color difference between the image resources displayed on the electronic device and the large-screen device may be reduced in the mirroring process. This improves users' visual experience during mirroring.

DESCRIPTION OF EMBODIMENTS

Figure 1:
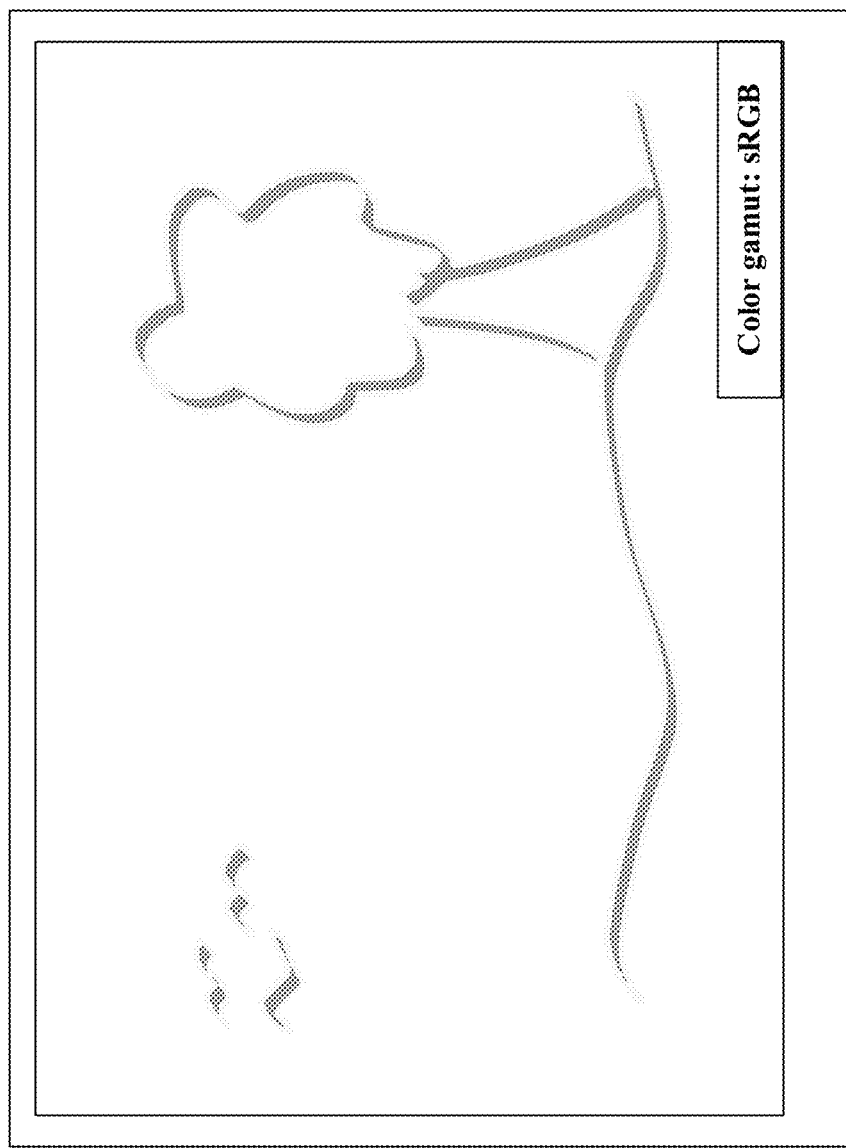
FIG. 1 is a schematic diagram of displaying an image resource by an electronic device 100 and a large-screen device 200 in an existing mirroring technology according to an embodiment of this application.
Figure 1:
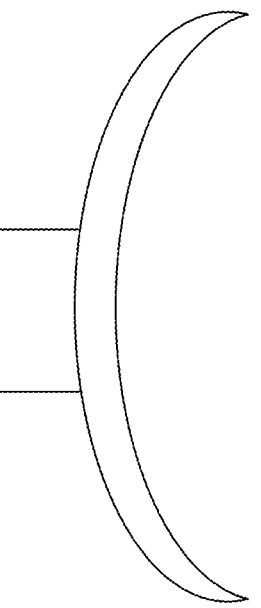
Figure 1:
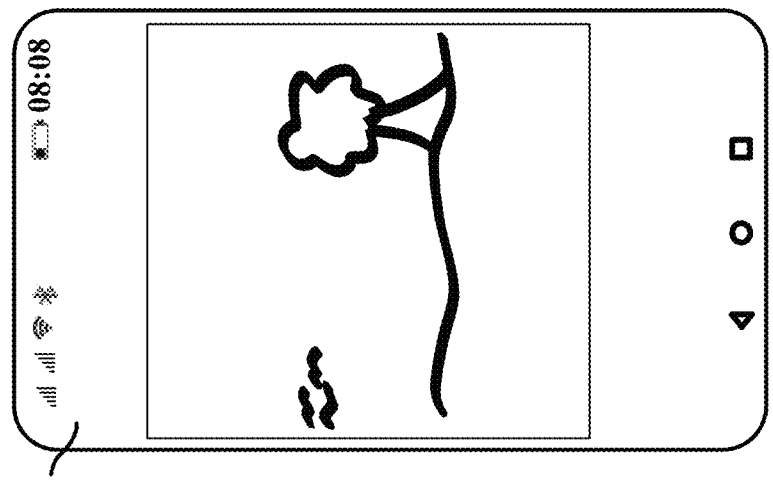

The technical solutions according to embodiments of this application are clearly described in the following with reference to the accompanying drawings. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

The terms "first" and "second" mentioned below are only intended for a purpose of description, and shall not be understood as an indication or implication of relative importance or implicit indication of the number of indicated technical features. Therefore, a feature limited to "first" and "second" may explicitly or implicitly include one or more of the features. In the descriptions of embodiments of this application, unless otherwise specified, "a plurality of" means two or more.

The term "user interface (user interface, UI)" in the following embodiments of this application is a medium interface for interaction and information exchange between an application or an operating system and a user, and implements conversion between an internal form of information and a form acceptable to the user. The user interface is source code written in a specific computer language such as Java or extensible markup language (extensible markup language, XML). The interface source code is parsed and rendered on an electronic device, and finally presented as content identifiable by the user. A common representation form of the user interface is a graphical user interface (graphic user interface, GUI), which is a user interface related to a computer operation and displayed in a graphical manner. It may be a visual interface element such as a text, an icon, a key, a menu, a tab, a text box, a dialog box, a status bar, a navigation bar, or a Widget that is displayed on a display of the electronic device.

The inventor of this application finds that, in a mirroring process, a color gamut used by a mobile phone for displaying an image resource has a wider coloring range, for example, a wide color gamut standard DCI-P3 (also referred to as P3). However, a color gamut used when a large-screen device plays an image resource sent by the mobile phone has a narrower coloring range, for example, a general color gamut standard, that is, a standard red, green, and blue (standard red green blue, sRGB) gamut. That is, richer colors of the image resource are displayed on the mobile phone, and simpler colors of the image resource are displayed on the large-screen device. As a result, there is a large difference between the image resources displayed on the mobile phone and the large-screen device, degrading user experience.

Miracast is a typical mirroring technology based on a real time streaming protocol (real time streaming protocol, RTSP). Because the RTSP protocol was proposed as early as 2004, in a miracast-based mirroring process, the electronic device can send only an image resource whose color gamut is sRGB to the large-screen device, and the large-screen device displays the image resource in sRGB.

In the case of limited color gamut technologies, there are a few types of color gamuts supported by the mobile phone and the large-screen device, and a coloring range is narrow. For example, both the mobile phone and the large-screen device support only sRGB. In this case, there is no obvious color difference between the image resources displayed on the mobile phone and the large-screen device in the mirroring process.

However, with development of display technologies, currently, the mobile phone and the large-screen device support more color gamuts with a wide coloring range. Because the current miracast technology is still based on the previously proposed RTSP protocol, there is an obvious color difference between image resources displayed on the mobile phone and the large-screen device in the miracast-based mirroring process. For example, a color gamut of the image resource displayed on the mobile phone is P3, while a color gamut of the image resource displayed on the large-screen device is sRGB.

FIG. 1 is a schematic diagram of displaying an image resource by an electronic device 100 and a large-screen device 200 in an existing mirroring technology according to an embodiment of this application.

As shown in FIG. 1, a color gamut of the image resource displayed by the electronic device 100 is P3, and a color gamut of an image resource displayed by the large-screen device 200 is sRGB. It can be learned that when the electronic device 100 and the large-screen device 200 do not use the mirroring method provided in embodiments of this application, there is a large color difference between the image resources displayed on the electronic device 100 and the large-screen device 200, resulting in poor users' visual experience.

To resolve the foregoing problem, embodiments of this application provide a mirroring method. According to the method, in a process in which an electronic device such as a mobile phone or a tablet and a large-screen device share an image resource through mirroring, the electronic device negotiates with the large-screen device about a color gamut used during mirroring. Then, the electronic device converts a color gamut of a collected image resource into the negotiated color gamut, encodes a converted image resource, and sends the encoded image resource to the large-screen device. After receiving and decoding the image resource, the large-screen device displays the image resource in the negotiated color gamut. The color gamut obtained through negotiation between the electronic device and the large-screen device is a color gamut with a widest coloring range and supported by both the electronic device and the large-screen device. For the process in which the electronic device and the large-screen device negotiate a color gamut used during mirroring and a specific implementation in which the electronic device converts the collected image resource into the color gamut, refer to related descriptions in subsequent embodiments. Details are not described herein again.

According to the method provided in embodiments of this application, the large-screen device may use a dynamic adaptive optimal color gamut during mirroring, that is, the color difference between the image resources displayed on the electronic device and the large-screen device may be reduced in the mirroring process. This improves users' visual experience in the mirroring process.

In the following embodiments of this application, mirroring means a mirroring technology that an electronic device (such as a mobile phone or a tablet) directly transmits, over a communication connection to a large-screen device (such as a television or a smart screen), an image resource to the large-screen device in a point-to-point manner, and then the large-screen device displays the image resource. The mirroring technology may include miracast, airplay, a private mirroring technology, and the like. The electronic device may also be referred to as a transmitting end/source end (source end), and the large-screen device may also be referred to as a receiving end (sink end).

The communication connection established between the electronic device and the large-screen device may include but is not limited to: a wireless fidelity direct (wireless fidelity direct, Wi-Fi direct) (also referred to as a wireless fidelity peer-to-peer (wireless fidelity peer-to-peer, Wi-Fi P2P)) communication connection, a Bluetooth communication connection, a near field communication (near field communication, NFC) connection, and the like.

It may be understood that the mirroring technology is merely a name used in embodiments, a meaning represented by the mirroring technology has been recorded in embodiments, and the name of the mirroring technology does not constitute any limitation on embodiments. In addition, in some other embodiments of this application, the mirroring technology may alternatively be termed differently, such as multi-screen interaction, full sharing mirroring, wireless display, osr the like.

In the following embodiments of this application, an image resource shared between the electronic device and the large-screen device may include any one or a combination of the following: a video, a text, a picture, a photo, audio, a table, or the like. For example, the image resource may be a movie, a teleplay, a short video, a musical, or the like.

In the following embodiments of this application, the image resource shared between the electronic device and the large-screen device may be a network image resource, a local image resource, or a combination of a network image resource and a local image resource. The network image resource is an image resource obtained by the electronic device from a network, for example, a video obtained from a server that provides a video service when the electronic device runs a video-type application. The local image resource is an image resource locally stored or generated by the electronic device, for example, a picture or a table locally stored by the electronic device.

In the following embodiments of this application, the color gamut is a color range. Specifically, there are currently a plurality of color models. A color is represented by using one-dimensional, two-dimensional, three-dimensional, or even four-dimensional spatial coordinates. A color range that may be defined by such coordinate system is a color gamut. The color model is an abstract mathematical model that uses a group of values to identify a color method. There are a plurality of color models, for example, a hue, saturation, and value (hue, saturation, value, HSV) color model, a red, green, and blue (red, green, blue, RGB) color model, and a cyan, magenta, yellow, and black (cyan, magenta, yellow, black, CMYK) color model.

The color gamut may include a plurality of types, for example, 2200 matt paper, sRGB, P3, Adobe RGB, and prophoto RG. If the color gamut is wider, a color range (that is, a coloring range) represented by the color gamut is larger, and color display effect is richer. The color gamut may also be referred to as color space. When the image resource is displayed in a color gamut with a wider coloring range, color display effect of the image resource is richer, and users' visual experience can be better met.

Color gamuts arranged according to coloring ranges from narrow to wide are as follows: 2200 matt paper, sRGB, P3, Adobe RGB, and prophoto RG.

sRGB is a general color standard jointly developed by Microsoft, HP, Mitsubishi, Epson, and other vendors. Currently, most display devices such as computer monitors and television sets use sRGB. Adobe RGB is a color gamut standard developed by Adobe. In comparison with sRGB color gamut, coloring ranges of the two color gamuts are different. Adobe RGB contains a color gamut that is not covered by sRGB. That is, Adobe RGB has a wider color gamut and may present richer colors. Generally, Adobe RGB color gamut may be applied to a field such as printing. prophotoRGB is a new color gamut developed by Adobe in recent years. The color gamut has a wider coloring range and is almost close to an ideal horseshoe shape of a visible color.

As one of the earliest color gamut standards, sRGB has a narrow coloring range and color display effect is not rich. In comparison with sRGB, a color gamut of P3 has a wider coloring range, and color display effect of the P3 is brighter and richer than that of sRGB. Therefore, P3 is widely used in a digital cinema as a new color standard, to meet users' visual experience.

A color gamut supported by a device such as an electronic device or a large-screen device is related to the following factors of the device: hardware settings of the device, and/or software settings of the device. The hardware settings mainly include: a color gamut capability (that is, a color gamut supported by a video card) of a video card configured on a display of the device. A full name of the video card (video card) is referred to as display interface card, and also referred to as video adapter (video adapter). The video card is used to perform converter driver on display information required by the device, provide a line scanning signal for a monitor, and control correct display of the monitor. The software settings include a color gamut capability provided by a mirroring service of the device during encoding and decoding.

To describe the mirroring method provided in embodiments of this application more clearly and in detail, the following first describes a mirroring system 10 provided in an embodiment of this application.

Figure 2:
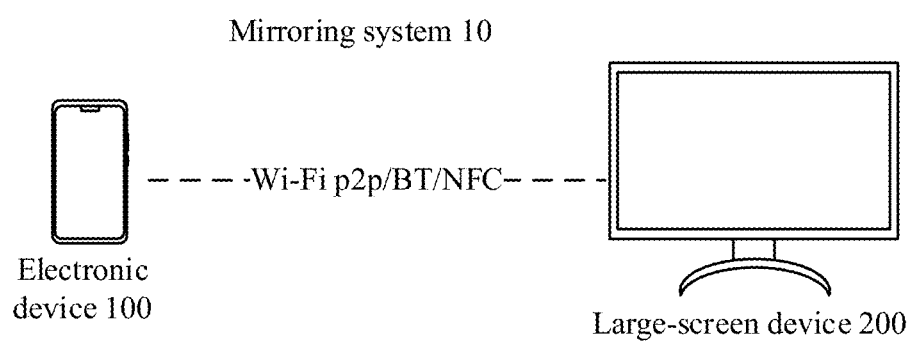
FIG. 2 is a schematic diagram of a structure of a mirroring system 10 according to an embodiment of this application.

FIG. 2 shows a mirroring system 10 according to an embodiment of this application.

As shown in FIG. 2, the mirroring system 10 includes an electronic device 100 and a large-screen device 200.

The electronic device 100 may be a portable electronic device such as a mobile phone, a tablet computer, a personal digital assistant (personal digital assistant, PDA), or a wearable device. An example embodiment of the portable electronic device includes but is not limited to a portable electronic device with iOS, Android, Microsoft, or another operating system. It can be further understood that, in some other embodiments of this application, the electronic device may not be a portable electronic device, but a laptop (laptop) computer that has a touch-sensitive surface (for example, a touch panel) or a desktop computer.

The large-screen device 200 is an electronic device that has a large-sized display, for example, a television set, a smart screen, an electronic billboard, or the like. The large-sized display configured for the large-screen device 200 is relative to the electronic device 100. In other words, a size of the display of the large-screen device 200 is greater than that of a display of the electronic device 100. In some embodiments, the television set may be used in cooperation with a television box (not shown in FIG. 2). The television box is configured to convert a received digital signal into an analog signal, and then send the analog signal to the television set for display. In some embodiments, the large-screen device 200 may be a television set having a digital-to-analog conversion function, or may be a television set with a television box.

In some embodiments, the large-screen device 200 may further be used in cooperation with a remote controller. The remote controller may communicate with the large-screen device 200 by using an infrared signal.

The electronic device 100 and the large-screen device 200 may share an image resource by using a mirroring technology. For related content of the mirroring technology, refer to the foregoing description. For example, miracast is used as an example. A Wi-Fi direct communication connection may be established between the electronic device 100 and the large-screen device 200. The electronic device 100 may transmit the image resource to the large-screen device 200 based on the Wi-Fi direct communication connection, and the large-screen device 200 plays the image resource.

In this embodiment provided in this application, in a process in which the electronic device 100 and the large-screen device 200 share the image resource through mirroring, the electronic device 100 negotiates with the large-screen device 200 about a color gamut used during mirroring. The electronic device 100 converts a color gamut of a collected image resource into the color gamut, encodes the converted image resource, and sends the encoded image resource to the large-screen device 200. After receiving and decoding the image resource, the large-screen device 200 displays the image resource in the negotiated color gamut. The color gamut obtained through negotiation between the electronic device 100 and the large-screen device 200 is a color gamut with a widest coloring range and supported by the electronic device 100 and the large-screen device 200. For the process in which the electronic device 100 and the large-screen device 200 negotiate a color gamut used during mirroring and a specific implementation in which the electronic device 100 converts the collected image resource into the color gamut, refer to related descriptions in subsequent embodiments. Details are not described herein again.

In some embodiments of this application, the mirroring system 10 may further include a Wi-Fi access point 300 and a server 400. The electronic device 100 may access the Wi-Fi access point 300. The server 400 may provide network audio and video services. For example, the server 400 may be a server that stores various image resources, for example, a Huawei video server that provides audio and video services. There may be one or more servers 400. When the electronic device 100 shares the image resource with the large-screen device 200 by using the mirroring technology, for example, the image resource may be a network video that is obtained from the server 400 through the Wi-Fi access point 300 when a video-type application runs on the electronic device 100.

Figure 3A:
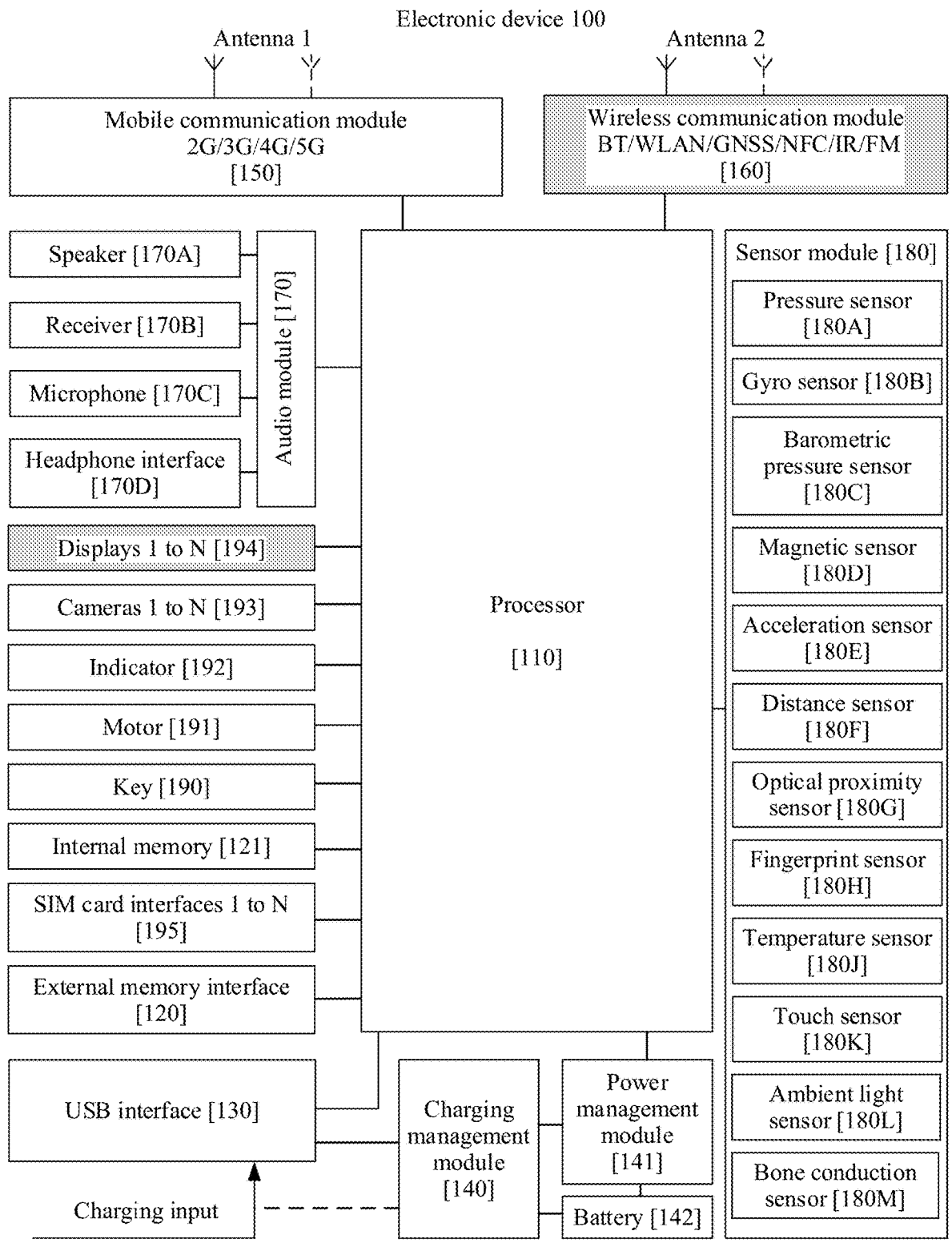
FIG. 3A is a schematic diagram of a hardware structure of an electronic device 100 according to an embodiment of this application.

FIG. 3A is a schematic diagram of a hardware structure of the electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

The memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution that is applied to the electronic device 100 and that includes wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into the electromagnetic wave through the antenna 1 for radiation. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and may be disposed in the same device with the mobile communication module 150 or another functional module.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 may receive an electromagnetic wave through the antenna 2, perform processing such as demodulation and filtering on the electromagnetic wave signal, and sends the processed signal to the processor 110. The wireless communication module 160 may further receive a to-be-sent signal from the processor 110, perform frequency modulation and amplification on the signal, and convert the signal into the electromagnetic wave through the antenna 2 for radiation.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, an NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a MicrooLed, a quantum dot light emitting diode (quantum dot light emitting diode, QLED), or the like. In some embodiments, the electronic device 100 may include one or N displays 194, where N is a positive integer greater than 1.

The display 194 may further include a video card. A full name of the video card (video card) is referred to as display interface card, and also referred to as video adapter (video adapter). The video card is used to perform converter driver on display information required by the device, provide a line scanning signal for a monitor, and control correct display of the monitor. A color gamut capability of the video card is a color gamut supported by the video card.

The electronic device 100 can enable a photographing function by using the ISP, the camera 193, the video codec, the GPU, the display 194, and the application processor.

The digital signal processor is configured to process a digital signal, and may process another digital signal in addition to a digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 may play back or record videos in a plurality of coding formats, for example, MPEG-1, MPEG-2, MPEG-3, and MPEG-4 provided by a moving picture experts group (moving picture experts group, MPEG).

The internal memory 121 may include one or more random access memories (random access memory, RAMs) and one or more non-volatile memories (non-volatile memory, NVMs).

The random access memory may include a static random-access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a 5th generation DDR SDRAM is generally referred to as DDR5 SDRAM), and the like.

The non-volatile memory may include a magnetic disk storage device and a flash memory (flash memory).

According to an operation principle, the flash memory may include a NOR FLASH, a NAND FLASH, a 3D NAND FLASH, and the like. According to a potential order of a storage unit, the flash memory may include a single-level cell (single-level cell, SLC), a multi-level cell (multi-level cell, MLC), a triple-level cell (triple-level cell, TLC), a quad-level cell (quad-level cell, QLC), and the like. According to a storage specification, the flash memory may include a universal flash storage (universal flash storage, UFS), an embedded multi media card (embedded multi media Card, eMMC), and the like.

The random access memory may be directly read and written by the processor 110, may be configured to store an executable program (for example, machine instructions) of an operating system or another running program, and may be further configured to store data of a user and an application.

The non-volatile memory may also store an executable program and store the data of the user and the application, and may be loaded to the random access memory in advance for the processor 110 to directly perform reading and writing.

The electronic device 100 may enable an audio function, for example, music playing and recording, through the audio module 170, the speaker 170A, the receiver 170B, the microphone 170C, the headset jack 170D, the application processor, and the like.

The pressure sensor 180A is configured to sense a pressure signal, and convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a message application icon, an instruction for viewing a message is executed. When a touch operation whose touch operation intensity is greater than or equal to the first pressure threshold is performed on the message application icon, an instruction for creating a new message is executed.

The touch sensor 180K is also referred to as a "touch panel". The touch sensor 180K may be disposed on the display 194, and the touch sensor 180K and the display 194 form a touch screen, and the touch screen is also referred to as "touchscreen". The touch sensor 180K is configured to detect a touch operation performed on or near the touch sensor. The touch sensor may transfer the detected touch operation to the application processor, to determine a type of a touch event. A visual output related to the touch operation may be provided by using the display 194. In some other embodiments, the touch sensor 180K may alternatively be disposed on a surface of the electronic device 100 at a location different from a location of the display 194.

In this embodiment of this application, the internal memory 121 may be configured to store the image resource.

In this embodiment of this application, the wireless communication module 160 may be configured to establish a communication connection (for example, a Wi-Fi direct communication connection or a Bluetooth communication connection) to the large-screen device 200.

Over the communication connection between the wireless communication module 160 and the large-screen device 200, the processor 110 may be configured to negotiate with the large-screen device 200 about a color gamut used during mirroring. For the negotiation process, refer to the detailed description of the subsequent method embodiments, and details are not described herein again.

The electronic device 100 may collect an image resource that is currently displayed, and send the image resource to the GPU. The GPU converts a color gamut of the image resource into a color gamut obtained through negotiation with the large-screen device. An image resource that is currently played and that is collected by the electronic device 100 may be a network image resource, may be a local image resource, or may be a combination of a network image resource and a local image resource. The network image resource is an image resource obtained by the electronic device from the network, for example, a video obtained from a server that provides a video service when the electronic device runs a video-type application. The local image resource is an image resource locally stored or generated by the electronic device, for example, a picture or a table locally stored by the electronic device. The wireless communication module 160 may further access a local area network established by the Wi-Fi access point 300 or another network. The wireless communication module 160 may support the electronic device 100 to obtain an image resource from the server 400 and share the image resource with the large-screen device 200 by using a mirroring technology.

In some embodiments, the video codec may be configured to encode an image resource obtained through conversion by the GPU, and send the encoded content to the wireless communication module 160. Video encoding refers to converting a file in an original video format into a file in another video format by using a compression technology. The video codec may encode the image resource in an encoding format, such as H.261, H.263, and H.264 defined by the International Telecommunication Union-telecommunication Standardization Sector (international telecommunication union-telecommunication standardization sector, ITU-T) and MPEG-1, MPEG-2, and MPEG-4 defined by the moving picture experts group (moving picture exports group, MPEG) of the International Organization for Standardization (international organization for standardization, ISO). The encoded image resource may be referred to as a transport stream (transport stream, TS). H.264 is a new generation of highly compressed digital video coding standard jointly formulated by the ITU-T and the MPEG. This standard is usually called H.264/AVC, AVC/H.264, H.264/MPEG-4 AVC, or MPEG-4/H.264 AVC. In some embodiments, the video codec may also use a series of other standards formulated by the motion-join photographic experts group (motion-join photographic experts group, M-JPEG). This is not limited in this embodiment of this application.

Then, the wireless communication module 160 may send the image resource to the large-screen device over a communication connection to the large-screen device 200. To be specific, the wireless communication module 160 may support the electronic device 100 and the large-screen device 200 to share the image resource by using the mirroring technology (for example, miracast). In this embodiment of this application, the display 194 may be configured to display the image resource, and the image resource depends on a specific operation of the user. In some embodiments, a color gamut used when the display 194 displays the image resource is a color gamut with a widest coloring range and supported by the display 194. In some other embodiments, the color gamut used when the display 194 displays the image resource is a color gamut with a widest coloring range and supported by the display 194 and an application currently running on the electronic device 100.

A software system of the electronic device 100 may use a layered architecture, an event-driven architecture, a microkernel architecture, a micro service architecture, or a cloud architecture. In this embodiment of this application, an Android system of the layered architecture is used as an example to illustrate a software structure of the electronic device 100.

Figure 3B:
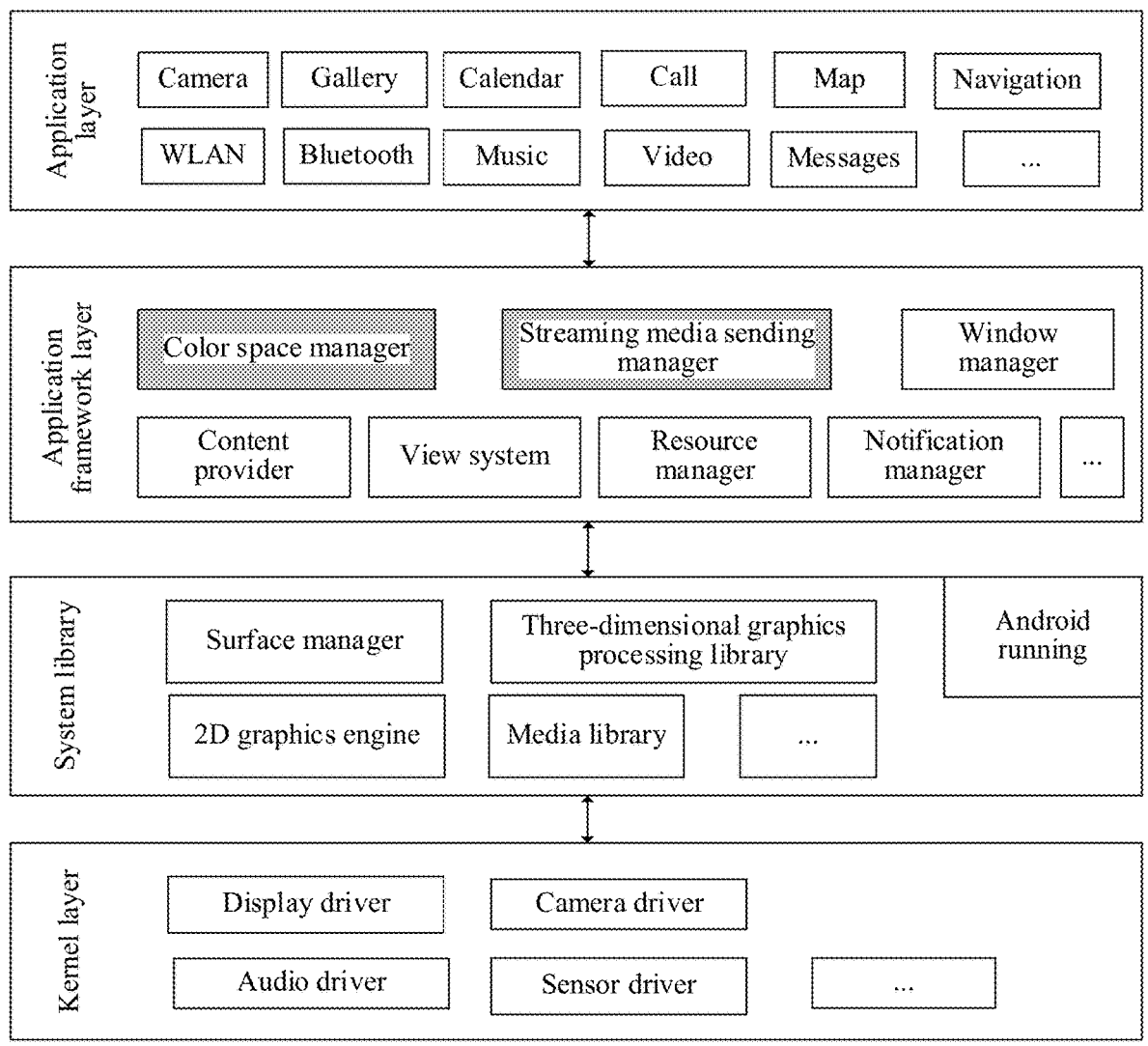
FIG. 3B is a block diagram of a software structure of an electronic device 100 according to an embodiment of this application.

FIG. 3B is a block diagram of a software structure of the electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3B, the application package may include an application such as a camera, a gallery, a calendar, a call, a map, navigation, a WLAN, Bluetooth, music, a video, and a message.

The application framework layer provides an application programming interface (application programming interface, API) and a programming framework for an application at the application layer. The application framework layer includes some predefined functions.

As shown in FIG. 3B, an application framework layer may include a color service, a streaming media sending manager, a window manager, a content provider, a view system, a resource manager, a notification manager, and the like.

The streaming media sending manager is configured to: establish the communication connection to the large-screen device 200; negotiate, over the communication connection, with the large-screen device 200 about a color gamut used during mirroring; and send, to the large-screen device 200, an image resource, where the image resource is a resource in the negotiated color gamut obtained through conversion.

The color service (color service) is configured to determine a color gamut used by the electronic device 100 and the large-screen device 200 in a mirroring process, and transfer the color gamut to a GPU of the electronic device 100, so that the GPU converts a color gamut of the image resource collected by the electronic device 100 into a color gamut determined by the color service.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, an audio, a call that is made and received, a browsing history and bookmark, a phone book, and the like.

The view system includes a visual control, such as a control for displaying a text and a control for displaying a picture. The view system may be configured to construct the application. A display interface may include one or more views. For example, a display interface including a notification icon of a message may include a text display view and a picture display view.

The resource manager provides various resources such as a localized character string, an icon, a picture, a layout file, and a video file for an application.

The notification manager enables an application to display notification information in the status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a performance function that needs to be invoked in java language and a kernel library of Android.

An application layer and the application framework layer run on the virtual machine. The virtual machine executes Java files at the application layer and the application framework layer as binary files. The virtual machine is configured to enable functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

A kernel layer is a layer between hardware and software. The kernel layer includes at least a display driver, a camera driver, an audio driver, and a sensor driver.

Figure 4:
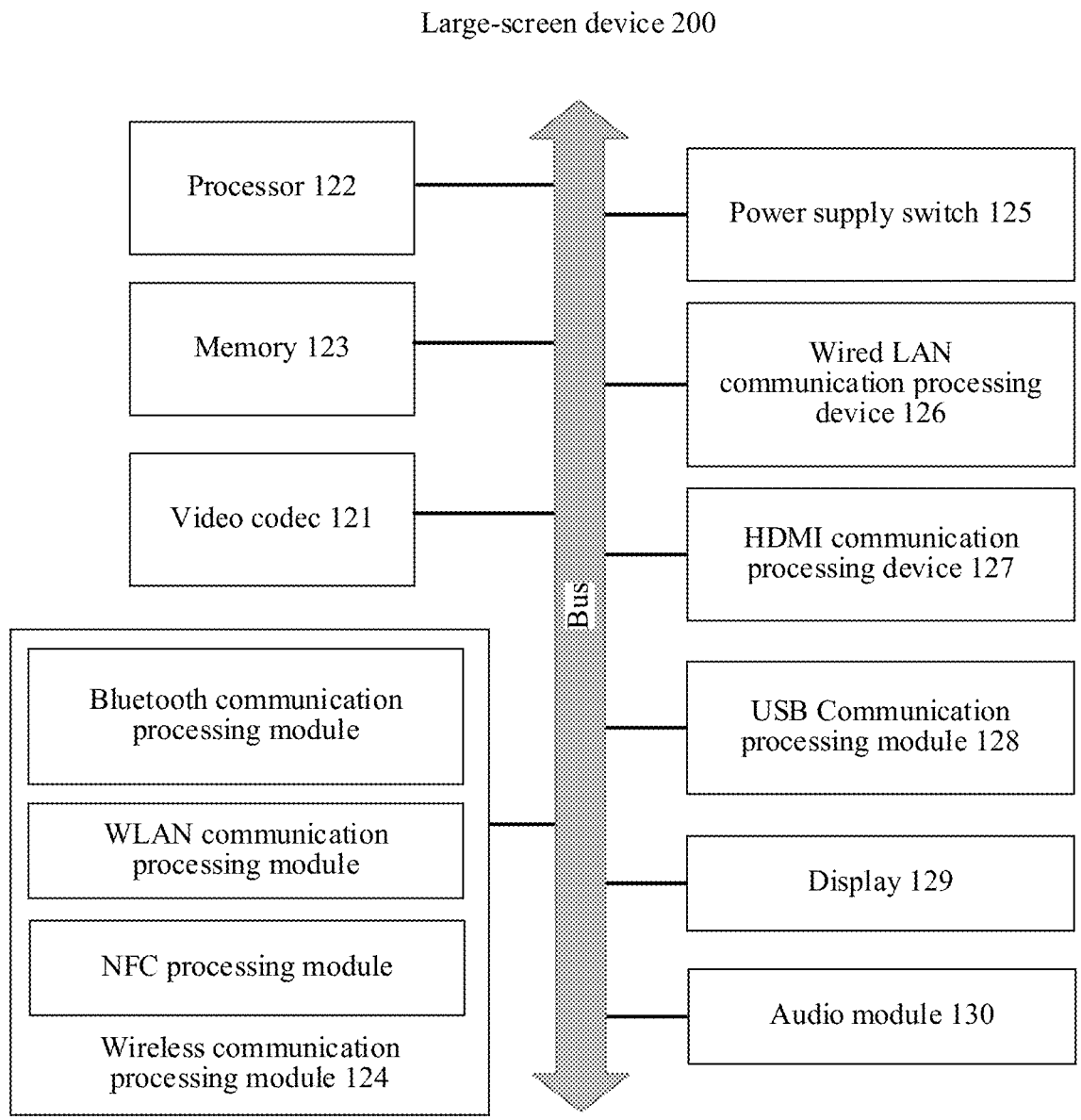
FIG. 4 is a schematic diagram of a hardware structure of a large-screen device 200 according to an embodiment of this application.

Refer to FIG. 4. FIG. 4 is a schematic diagram of a hardware structure of a large-screen device 200 according to an embodiment of this application.

As shown in FIG. 4, the large-screen device 200 may include: a video codec 121, a processor 122, a memory 123, a wireless communication processing module 124, a power switch 125, a wired LAN communication processing module 126, a high-definition multimedia interface (high definition multimedia interface, HDMI) communication processing module 127, a USB communication processing module 128, and a display 129, and an audio module 130. The modules may be connected through a bus.

The processor 122 may be configured to read and execute computer-readable instructions. In a specific implementation, the processor 122 may mainly include a controller, an arithmetic unit, and a register. The controller is mainly responsible for decoding instructions, and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. In the specific implementation, a hardware architecture of the processor 122 may be an application-specific integrated circuit (ASIC) architecture, a MIPS architecture, an ARM architecture, an NP architecture, or the like.

The wireless communication processing module 124 may include a WLAN communication processing module 124A, and may further include a Bluetooth (BT) communication processing module 124B, an NFC processing module 124C, a cellular mobile communication processing module (not shown), and the like.

In some embodiments, the wireless communication processing module 124 may be configured to establish a communication connection to the large-screen device 200, and receive, over the communication connection, an encoded image resource sent by the large-screen device 200. For example, the WLAN communication processing module 124A may be configured to establish a Wi-Fi direct communication connection to the large-screen device 200, and the Bluetooth (BT) communication processing module 124B may be configured to establish a Bluetooth communication connection to the large-screen device 200, and the NFC processing module 124C may be configured to establish an NFC connection to the large-screen device 200. To be specific, the wireless communication processing module 124 may support the large-screen device 200 and the electronic device 100 to share the image resource by using a mirroring technology (for example, miracast).

In an implementation, the wireless communication processing module 124 may monitor a signal such as a probe request or a scanning signal transmitted by another device (for example, the electronic device 100), discover another electronic device (for example, the electronic device 100) of an attachment, and establish a communication connection to the another device (for example, the electronic device 100). In another implementation, the wireless communication processing module 124 may also transmit the signal such as a probe request or a scanning signal, so that the another device (for example, the electronic device 100) can discover the large-screen device 200, and establish a communication connection (for example, a Wi-Fi direct communication connection) to the another device (for example, the electronic device 100).

The video codec 121 is configured to compress or decompress a digital video. In this embodiment of this application, the video codec 121 may decompress the image resource from the electronic device 100. The large-screen device 200 may support one or more video codecs. In this way, the large-screen device 200 may play videos in a plurality of encoding formats, for example, MPEG-1, MPEG-2, MPEG-3, MPEG-4, H.261, H.263, and H.264.

The processor 122 may be configured to parse a signal received by the wireless communication processing module 124, for example, a probe request broadcast by the electronic device 100. The processor 122 may be configured to perform a corresponding processing operation based on a parsing result, for example, generate a probe response. The processor 122 may be configured to drive, based on a decompression result of the video codec 121, the display 129 to perform displaying.

The memory 123 is coupled to the processor 122, and is configured to store various software programs and/or a plurality of sets of instructions. In the specific implementation, the memory 123 may include a high-speed random access memory, and may also include a non-volatile memory, for example, one or more disk storage devices, a flash memory device, or another non-volatile solid-state storage device. The memory 123 may store an operating system, for example, an embedded operating system such as uCOS, VxWorks, or RTLinux. The memory 123 may further store a communication program. The communication program may be used to communicate with electronic device 100, one or more servers, or an additional device.

The power switch 125 may be configured to control a power supply to supply power to the large-screen device 200.

The wired LAN communication processing module 126 may be configured to communicate with another device in a same LAN via a wired LAN, may be further configured to connect to a WAN via the wired LAN, and may communicate with a device in the WAN.

The HDMI communication processing module 127 may be configured to communicate with the another device by using an HDMI interface (not shown).

The USB communication processing module 128 may be configured to communicate with the another device by using a USB interface (not shown).

The display 129 may be configured to display an image, a video, or the like. The display 129 may be a display such as an LCD, an OLED, an AMOLED, an FLED, or a QLED. For content displayed on the display 129, refer to related descriptions in subsequent method embodiments.

In this embodiment of this application, the display 129 is configured to display, in a color gamut obtained through negotiation between the large-screen device 200 and the electronic device 100, the image resource sent by the electronic device 100.

The audio module 130 may be configured to output an audio signal by using an audio output interface, so that the large-screen device 200 may support audio playback. The audio module 130 may be further configured to receive audio data by using an audio input interface. The audio module 130 may include but is not limited to a microphone, a loudspeaker, a receiver, and the like.

In some embodiments, the large-screen device 200 may further include a serial interface such as an RS-232 interface. The serial interface may be connected to the another device, for example, an audio loudspeaker such as a sound box, so that the display and the audio loudspeaker may collaboratively play an audio and a video.

It may be understood that the structure shown in FIG. 4 does not constitute a specific limitation on the large-screen device 200. In some other embodiments of this application, the large-screen device 200 may include more or fewer components than those shown in the figure, combine some components, split some components, or have different component arrangements. The components shown in the figure may be implemented by using hardware, software, or a combination of software and hardware.

A software system of the large-screen device 200 may use a layered architecture, an event-driven architecture, a microkemel architecture, a micro service architecture, or a cloud architecture. For example, the software system of the large-screen device 200 may be a HarmonyOS system, an Android system, or the like.

The software system of the large-screen device 200 may include a streaming media receiving manager. The streaming media receiving manager is configured to establish a communication connection to the electronic device 100, negotiate, over the communication connection, with the electronic device 100 a color gamut used during mirroring, and receive an image resource sent by the electronic device 100.

The following describes in detail the mirroring method provided in embodiments of this application based on the schematic diagram of the mirroring system 10 shown in FIG. 2, the schematic diagrams of the hardware and software structures of the electronic device 100 shown in FIG. 3A and FIG. 3B, and the schematic diagram of the hardware structure of the large-screen device 200 shown in FIG. 4, and reference to a procedure and a user interface for implementing the mirroring method on the electronic device 100 and the large-screen device 200 provided in embodiments of this application.

Figure 5:
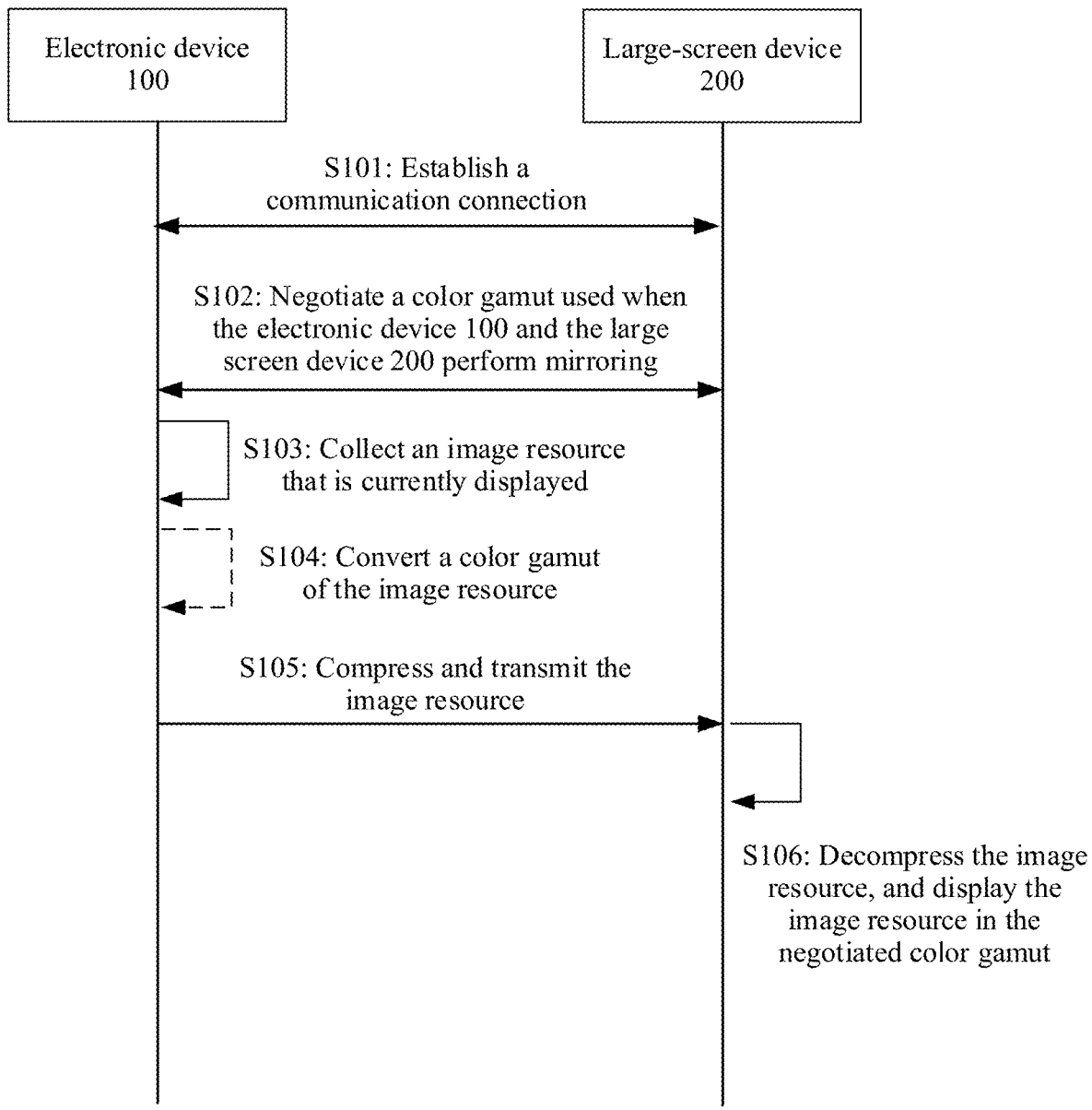
FIG. 5 is a flowchart of a mirroring method according to an embodiment of this application.

FIG. 5 shows an example of a procedure of a mirroring method according to an embodiment of this application. The procedure includes the following steps.

S101: The electronic device 100 establishes a communication connection to the large-screen device 200.

The communication connection between the electronic device 100 and the large-screen device 200 may include but is not limited to a Wi-Fi P2P communication connection, a Bluetooth communication connection, an NFC connection, and the like.

FIG. 6A to FIG. 6D show examples of user interfaces for establishing the communication connection between the electronic device 100 and the large-screen device 200.

Figure 6A:
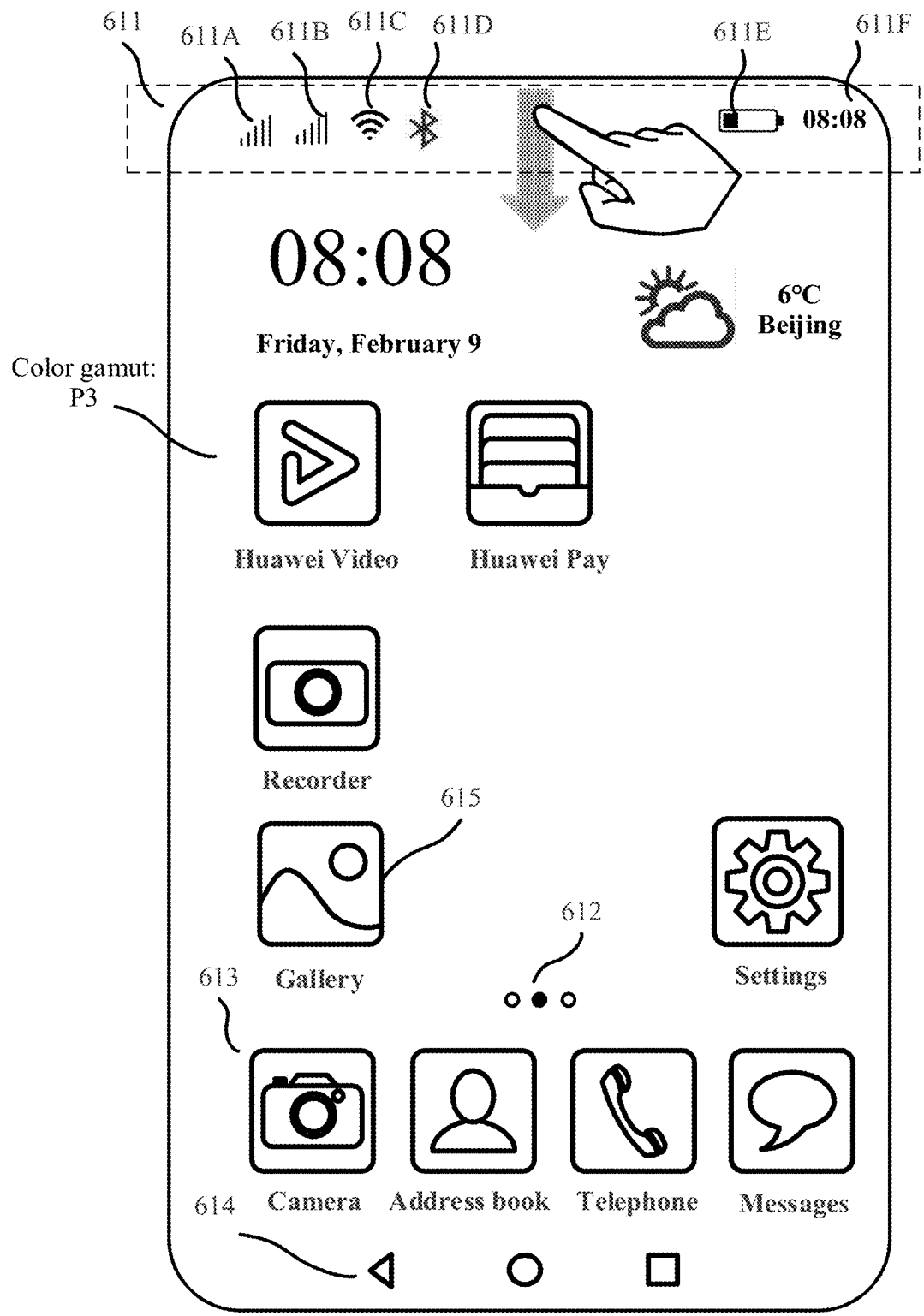
FIG. 6A to FIG. 6E are schematic diagrams of a group of user interfaces according to an embodiment of this application.

FIG. 6A shows an example of a user interface 610 that is disposed on the electronic device 100 and that is configured to display an application installed on the electronic device 100.

As shown in FIG. 6A, the user interface 610 may include a status bar 611, a page indicator 612, a tray 613 having a common application icon, a navigation bar 614, and a plurality of other application icons.

The status bar 611 may include one or more signal strength indicators (such as a signal strength indicator 611A and a signal strength indicator 611B) of a mobile communication signal (which may also be referred to as a cellular signal), and one or more signal strength indicators 611C of a wireless fidelity (wireless fidelity, Wi-Fi) signal, a battery status indicator 611E, and a time indicator 611F.

After the electronic device 100 enables Bluetooth, an indicator 611D may be further displayed in the status bar 611. The indicator 611D may indicate that the electronic device 100 successfully enables Bluetooth.

The page indicator 612 may indicate a position relationship between a currently displayed page and another page.

The tray 613 having a common application icon may include a plurality of tray icons (for example, a camera application icon, an address book application icon, a telephony application icon, and an information application icon). The tray icons remain displayed during page switching. The tray icon is optional. This is not limited in this embodiment of this application.

The other application icons may be a plurality of application icons, for example, a gallery application icon 615, a Huawei Video application icon, a Huawei Pay application icon, a recorder application icon, and a settings application icon. The other application icons may be distributed on a plurality of pages. The page indicator 612 may further indicate a page on which an application is currently browsed by a user. The user may slide, leftwards or rightwards, an area in which another application icon is displayed, to browse an application icon on the another page.

The navigation bar 614 may include a system navigation key such as a return key, a home screen key, or a multitasking key.

In some embodiments, the user interface 610 shown in FIG. 6A may be a home screen (home screen). It may be understood that FIG. 6A only shows an example of one user interface of the electronic device 100, and should not constitute a limitation on this embodiment of this application.

Figure 6B:
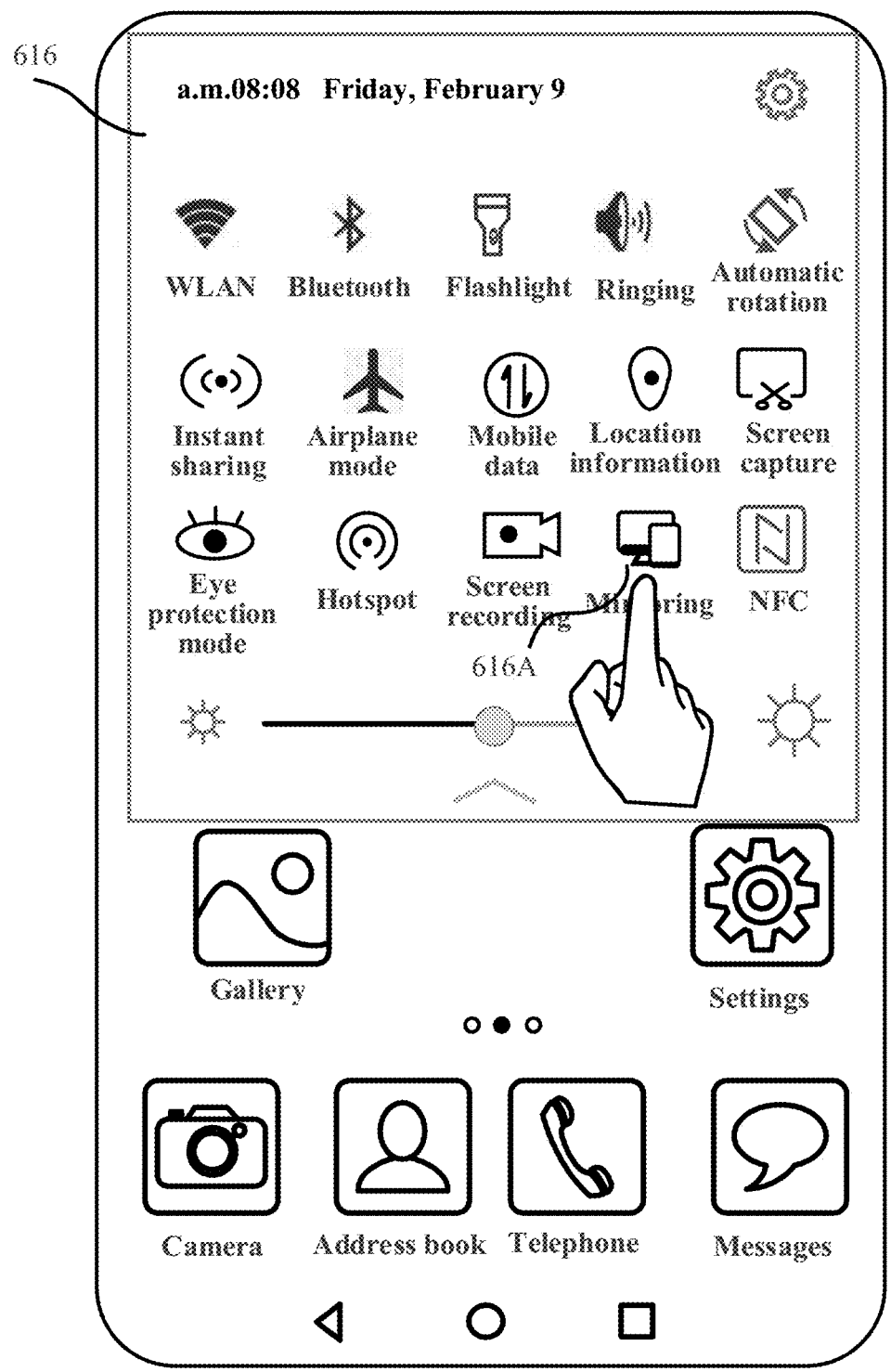

As shown in FIG. 6A and FIG. 6B, when the electronic device 100 detects a slide down gesture on a display, the electronic device 100 may display a window 616 on the user interface 610 in response to the slide down gesture. As shown in FIG. 6B, a control 616A may be displayed in the window 616, and the control 616A may receive an operation (for example, a touch operation or a tap operation) of enabling/disabling a mirroring function of the electronic device. A representation form of the control 616A may include an icon and/or a text (for example, a text "wireless mirroring", "mirroring", or "multi-screen interaction"). The window 616 may further display an on/off control having another function such as Wi-Fi, Bluetooth, or a flashlight.

As shown in FIG. 6B, the electronic device 100 may detect a user operation that is performed on the control 616A and that is used to enable the mirroring function. In some embodiments, after detecting the user operation performed on the control 616A, the electronic device 100 may change a display form of the control 616A, for example, a shadow when the display control 616A is added.

Not limited to the home screen shown in FIG. 6A, the user may further input the slide downward gesture on another screen, to trigger the electronic device 100 to display the window 616.

Not limited to the user operation performed by the user on the control 616A in the window 616 shown in FIG. 6A and FIG. 6B, in this embodiment of this application, the user operation used to enable the mirroring function may alternatively be implemented in another form. This is not limited in this embodiment of this application.

For example, the electronic device 100 may further display a settings interface provided by a settings (settings) application. The settings interface may include a control that is provided for the user to enable/disable the mirroring function of the electronic device 100. The user may enable the mirroring function of the electronic device 100 by entering the user operation on the control.

Figure 6C:
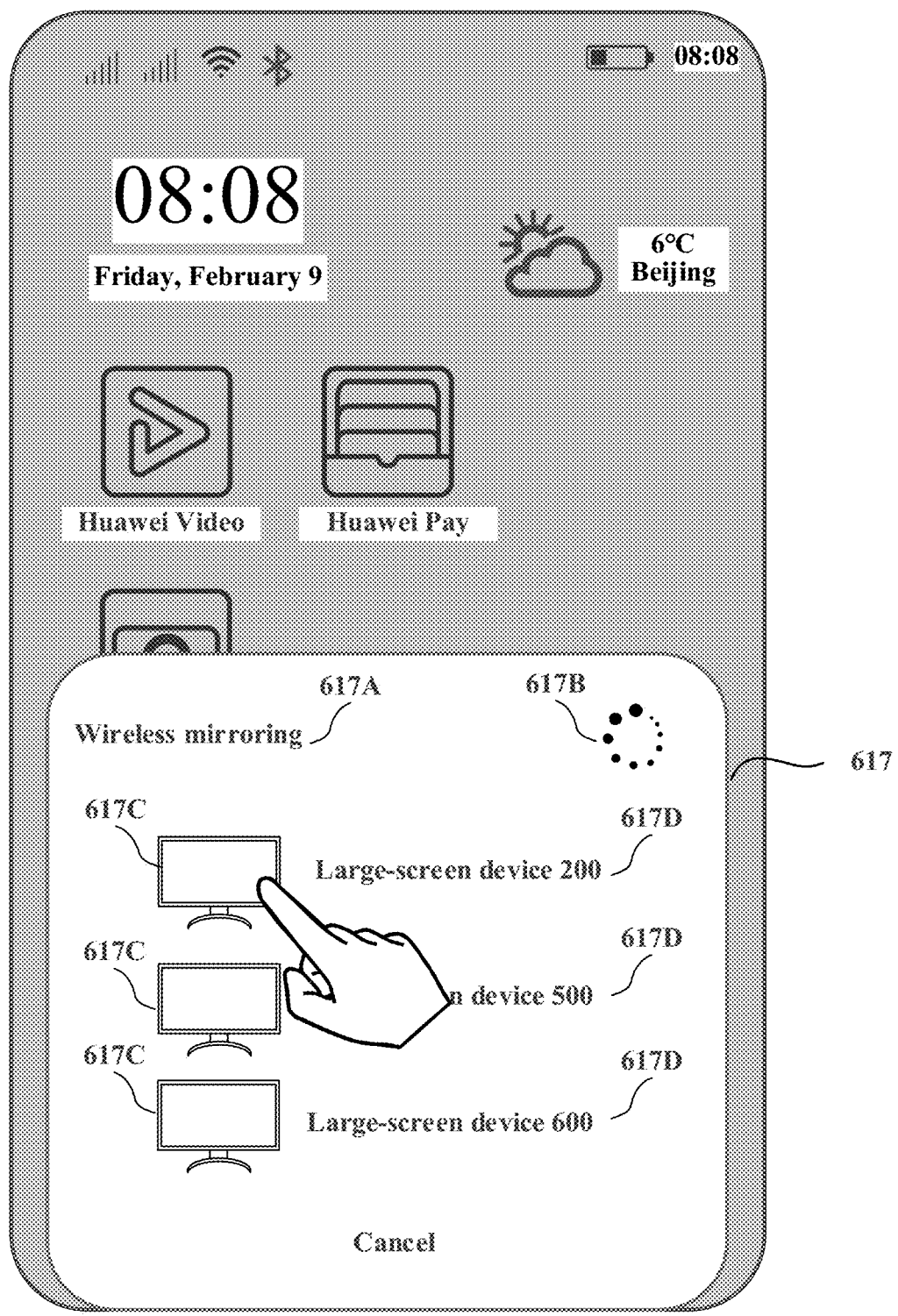

As shown in FIG. 6C, in response to the user operation that is detected in FIG. 6B and that is used to enable the mirroring function, the electronic device 100 enables one or more of WLAN, Bluetooth, or NFC in the wireless communication module 160, and discovers a large-screen device that can be projected and that is near the electronic device 100 by using one or more wireless communication technologies of Wi-Fi direct communication, Bluetooth, and NFC. For example, the electronic device 100 may scan, by using the Wi-Fi direct communication technology, a probe request (for example, a probe request frame) broadcast by another nearby device, and discover a nearby large-screen device 200 and another large-screen device (for example, a large-screen device 500 and a large-screen device 600 that are not shown in the mirroring system in FIG. 2). As shown in FIG. 6C, the user interface 610 displayed by the electronic device 100 includes a window 617. The window 617 may display an interface indicator 617A, an icon 617B, an image 617C of a large-screen device discovered by the electronic device, and an identifier 617D.

The interface indicator 617A may indicate that content displayed in the window 617 is information of a large-screen device discovered after the mirroring function is enabled. The icon 617B may indicate that the electronic device 100 is further continuously discovering another surrounding large-screen device. When the electronic device 100 does not discover the nearby large-screen device, a quantity of large-screen devices displayed in the window 617 is 0. Both the image 617C and the identifier 617D of the large-screen device may be carried in a probe request (for example, a probe request frame) broadcast by the large-screen device. The image 617C and/or the identifier 617D may receive a user operation (for example, a touch operation), and in response to this user operation, the electronic device 100 may initiate a request for establishing a communication connection to a large-screen device corresponding to the image 617C and/or the identifier 617D.

Figure 6D:
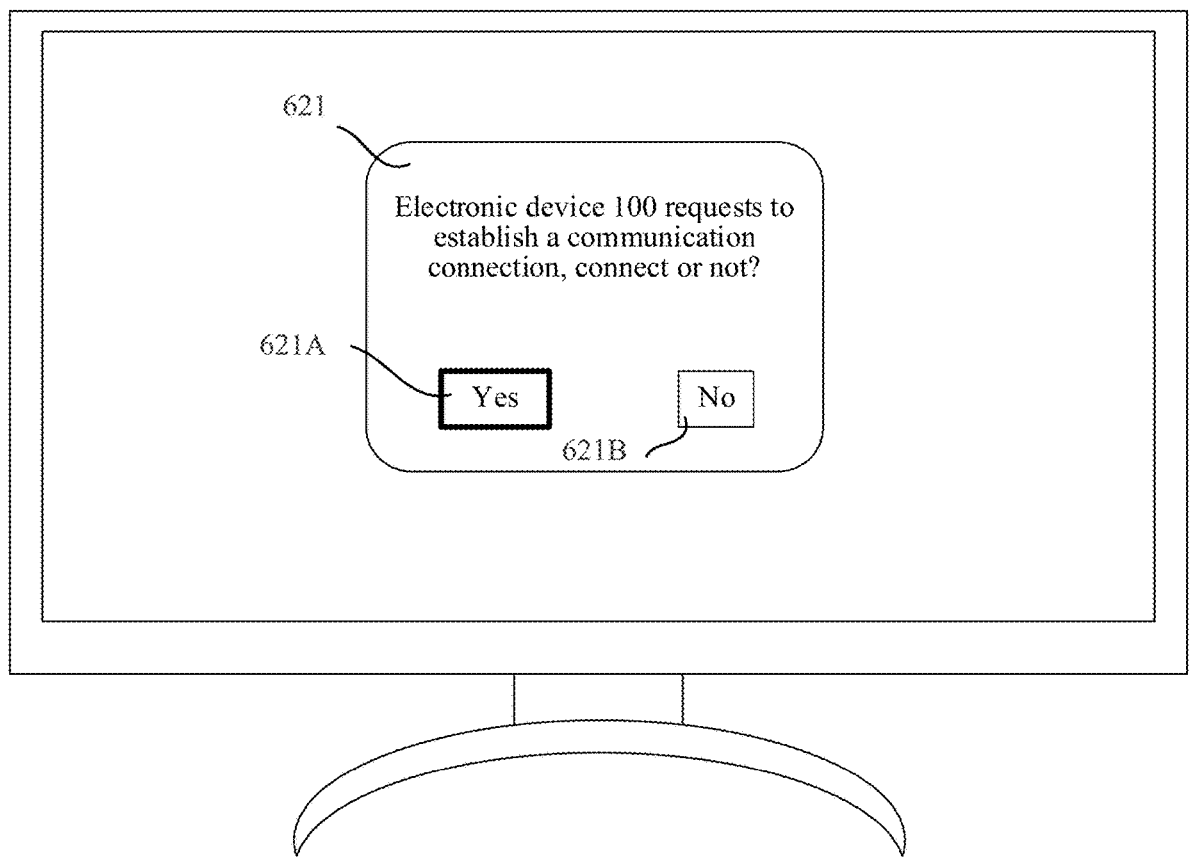

FIG. 6D shows an example in which a user interface 620 is displayed on the display after the large-screen device 200 receives the request for establishing a communication connection sent by the electronic device 100. The user interface 620 includes a window 621. The window 621 is configured to prompt the user that the electronic device 100 requests to establish a communication connection. The large-screen device 200 may detect an operation of determining to establish a communication connection for mirroring to the electronic device 100. For example, the user taps a control 621A by using the remote controller shown in FIG. 6D, and in response to this operation, the large-screen device 200 establishes the communication connection for mirroring to the electronic device 100. Alternatively, the large-screen device 200 detects an operation of refusing to establish a communication connection for mirroring to the electronic device 100. For example, the user taps a control 621B by using the remote controller shown in FIG. 6D, and in response to the operation, the large-screen device 200 refuses to establish the communication connection for mirroring to the electronic device 100.

Not limited to the manner of establishing the communication connection between the electronic device 100 and the large-screen device 200 shown in FIG. 6A to FIG. 6D, in another embodiment, the communication connection may be established in another manner. This is not limited herein. For example, the large-screen device 200 may provide an NFC tab. The NFC tab carries an identifier (for example, a MAC address) of the large-screen device 200. When the user approaches the electronic device 100 to the large-screen device 200, the electronic device 100 may read the identifier in the NFC tab, and directly establish a communication connection to the large-screen device 200 corresponding to the identifier. Alternatively, the communication connection may be a Wi-Fi P2P connection, a Bluetooth connection, an NFC connection, or the like.

Figure 6E:
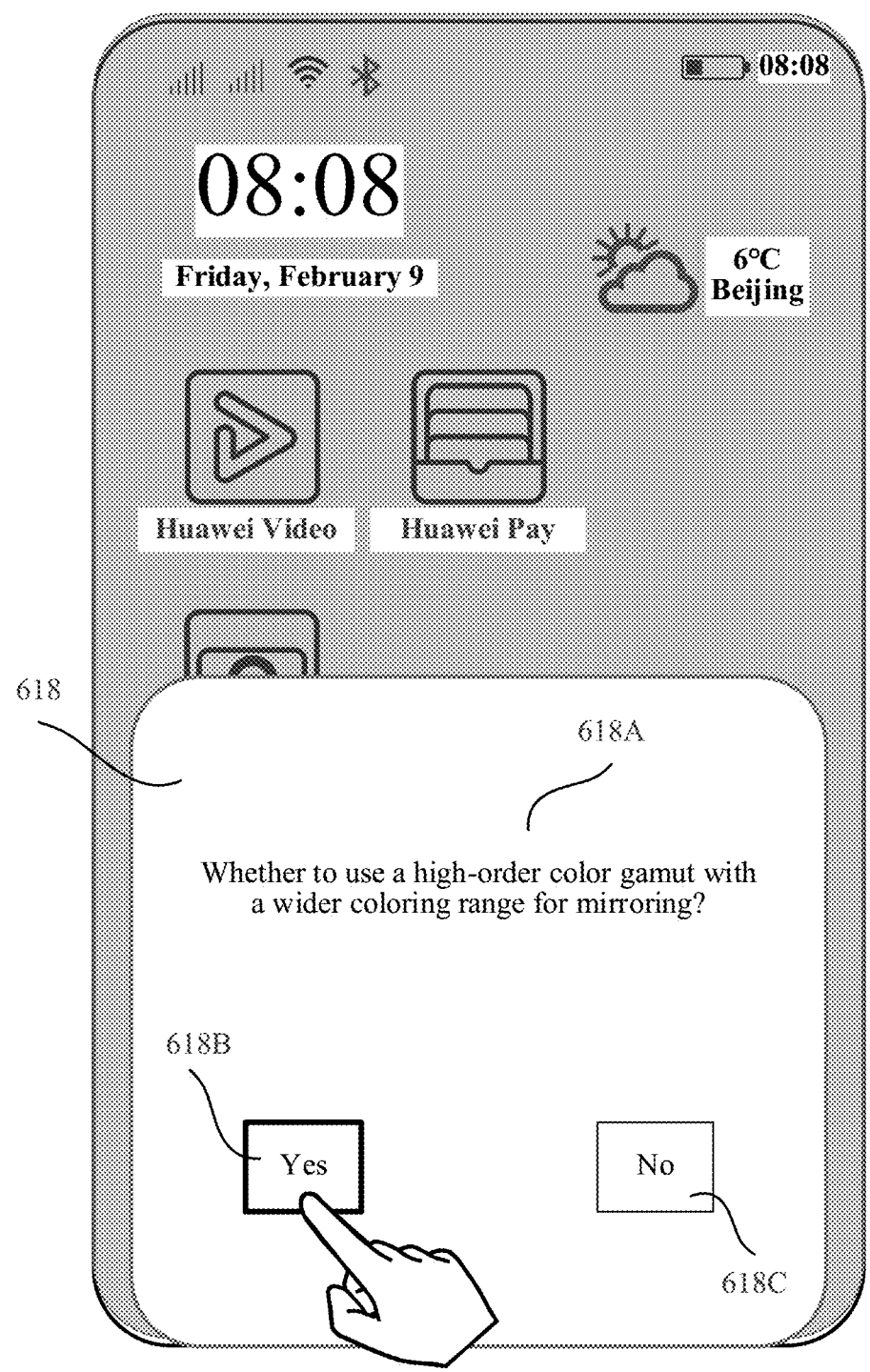

In some embodiments, after a mirroring connection is established between the electronic device 100 and the large-screen device 200, the electronic device 100 may further display the user interface 610 shown in FIG. 6E. The user interface 610 includes a window 618. The window 618 includes prompt information 618A, a control 618B, and a control 618C. The prompt information 618A prompts the user to perform mirroring by using a basic color gamut or a high-order color gamut with a wider coloring range. The electronic device 100 may detect an operation that the user uses the high-order color gamut with a wider coloring range for mirroring. For example, the user taps the control 618A shown in FIG. 6E, and in response to this operation, the electronic device 100 performs subsequent steps S102 to S106. For details, refer to the following description. Alternatively, the electronic device 100 may detect an operation that the user uses the basic color gamut for mirroring. For example, the user taps the control 618B shown in FIG. 6E, and in response to this operation, the electronic device 100 shares an image resource with the large-screen device 200 in the basic color gamut.

To help the user understand the prompt information 618A shown in the window 618, the prompt information 618A may also be represented in another form. For example, the prompt information 618A may further explain that the basic color gamut is a color gamut with a narrow coloring range, and the high-order color gamut is a color gamut with a wide coloring range. Therefore, the prompt information 618A in the window 618 shown in FIG. 6E is not limited in this embodiment of this application.

In the manner of prompting the user shown in FIG. 6E, the user may independently select, based on a requirement, whether to use the color gamut with a wider coloring range to perform the mirroring. This improves user experience.

S102: The electronic device 100 negotiates a first color gamut over the communication connection to the large-screen device 200.

In some embodiments, the electronic device 100 may negotiate the first color gamut after establishing the communication connection to the large-screen device 200.

In some other embodiments, after establishing the communication connection to the large-screen device 200 and detecting the user operation performed on the control 618B shown in FIG. 6E, the electronic device 100 may negotiate with the large-screen device 200 about the first color gamut over the communication connection.

In this embodiment of this application, the electronic device 100 may support a plurality of color gamuts, for example, sRGB and P3. The large-screen device 200 may also support a plurality of color gamuts, for example, sRGB, P3, Adobe RGB, and prophoto RGB. A color gamut supported by the electronic device 100 or the large-screen device 200 is related to a display configured for the electronic device 100 or the large-screen device 200. For a specific principle, refer to the foregoing related descriptions.

In some embodiments, the first color gamut is a color gamut with a widest coloring range and supported by both the electronic device 100 and the large-screen device 200. For example, if the color gamut supported by the electronic device 100 includes sRGB and P3 and the color gamut supported by the large-screen device 200 includes sRGB, P3, Adobe RGB, and prophoto RGB, the first color gamut may be P3.

In this embodiment of this application, the electronic device 100 and the large-screen device 200 may negotiate the first color gamut in either of the following two manners:

(1) The electronic device 100 determines the first color gamut, and sends the first color gamut to the large-screen device 200. For a meaning of the first color gamut determined by the electronic device 100, refer to the foregoing description.

A specific implementation is: The electronic device 100 extends a colormode field in an M3 request packet based on an existing mirroring protocol such as an RTSP protocol, and requests, from the large-screen device 200 via the colormode field, the color gamut supported by the large-screen device 200. In an M3 reply packet, the large-screen device 200 includes, in the extended colormode field, a color gamut capability set supported by the large-screen device 200, for example, sRGB, P3, Adobe RGB, and prophoto RGB. The electronic device 100 obtains an intersection set between a color gamut capability set supported by the electronic device 100, for example, sRGB and P3, and the color gamut capability set supported by the large-screen device 200; and selects, as the first color gamut, a color gamut with a widest coloring range from the intersection set.

In some embodiments, after determining the first color gamut, the electronic device 100 may further send or notify the first color gamut to the large-screen device 200. For example, after determining the first color gamut, the electronic device 100 may send an M4 packet to the large-screen device 200 based on the RTSP protocol, and add the first color gamut to a colormode field of the M4 packet.

In this embodiment of this application, the M3 request packet, the M3 reply packet, and the M4 packet may be respectively referred to as a first message, a second message, and a third message.

(2) After determining the first color gamut, the large-screen device 200 sends the first color gamut to the electronic device 100.

A specific implementation is: The large-screen device 200 extends a colormode field in an M3 request packet based on an existing mirroring protocol such as an RTSP protocol, and requests, from the electronic device 100 via the colormode field, the color gamut supported by the electronic device 100. In an M3 reply packet, the electronic device 100 includes, in the extended colormode field, a color gamut capability set supported by the electronic device 100, for example, sRGB and P3. The large-screen device 200 obtains an intersection set between a color gamut capability set supported by the large-screen device 200, for example, sRGB, P3, Adobe RGB, and prophoto RGB, and the color gamut capability set supported by the electronic device 100; and selects, as the first color gamut, a color gamut with a widest coloring range from the intersection set. After determining the first color gamut, the large-screen device 200 sends or notifies the first color gamut to the electronic device 100.

In the foregoing two manners, both the electronic device 100 and the large-screen device 200 communicate with each other over the communication connection established in the step S101.

In some embodiments, the electronic device 100 may further negotiate more information with the large-screen device 200 over the communication connection to the large-screen device 200, for example, a resolution, an encoding/decoding format, a frame rate, and a bit rate that are used during mirroring. The encoding/decoding format used during mirroring may include but is not limited to MPEG-1, MPEG-2, MPEG-3, MPEG-4, H.261, H.263, and H.264.

S103: The electronic device 100 collects an image resource that is currently displayed, where a color gamut of the collected image resource is a color gamut supported by an application currently running on the electronic device 100.

There may be a plurality of applications running on the electronic device 100, for example, a status bar and a desktop, or a status bar and a video-type application. Alternatively, there may be one application running on the electronic device 100, for example, a video-type application or a gallery.

An image resource provided by the application may be a network image resource, may be a local image resource, or may be a combination of a network image resource and a local image resource. The network image resource is an image resource obtained by the electronic device from a network, for example, a video obtained from a server that provides a video service when the electronic device runs a video-type application. The local image resource is an image resource locally stored or generated by the electronic device, for example, a picture or a table locally stored by the electronic device.

When the user interface displayed by the electronic device 100 is provided by one application, a color gamut of the image resource collected by the electronic device 100 is a color gamut supported by the application. The one application may be referred to as a first application, the color gamut supported by the one application may be referred to as a second color gamut, and an image resource provided by the one application may be referred to as a first image resource.

When the user interface displayed by the electronic device 100 is provided by a plurality of applications, the image resource collected by the electronic device 100 includes image resources separately provided by the plurality of applications, and a color gamut of each image resource is a color gamut supported by a corresponding application. For example, when the user interface displayed by the electronic device 100 is provided by a first application and a second application (for example, in a split screen scenario), a color gamut supported by the first application may be referred to as a second color gamut, and an image resource provided by the first application may be referred to as a first image resource. A color gamut supported by the second application may be referred to as a third color gamut, and an image resource provided by the second application may be referred to as a second image resource.

The color gamut supported by the application may be set in advance by a developer of the application. Different applications may support different color gamut. For example, the color gamut supported by the video-type application may include sRGB and P3. A color gamut supported by an instant messaging application may be sRGB.

Figure 6F:
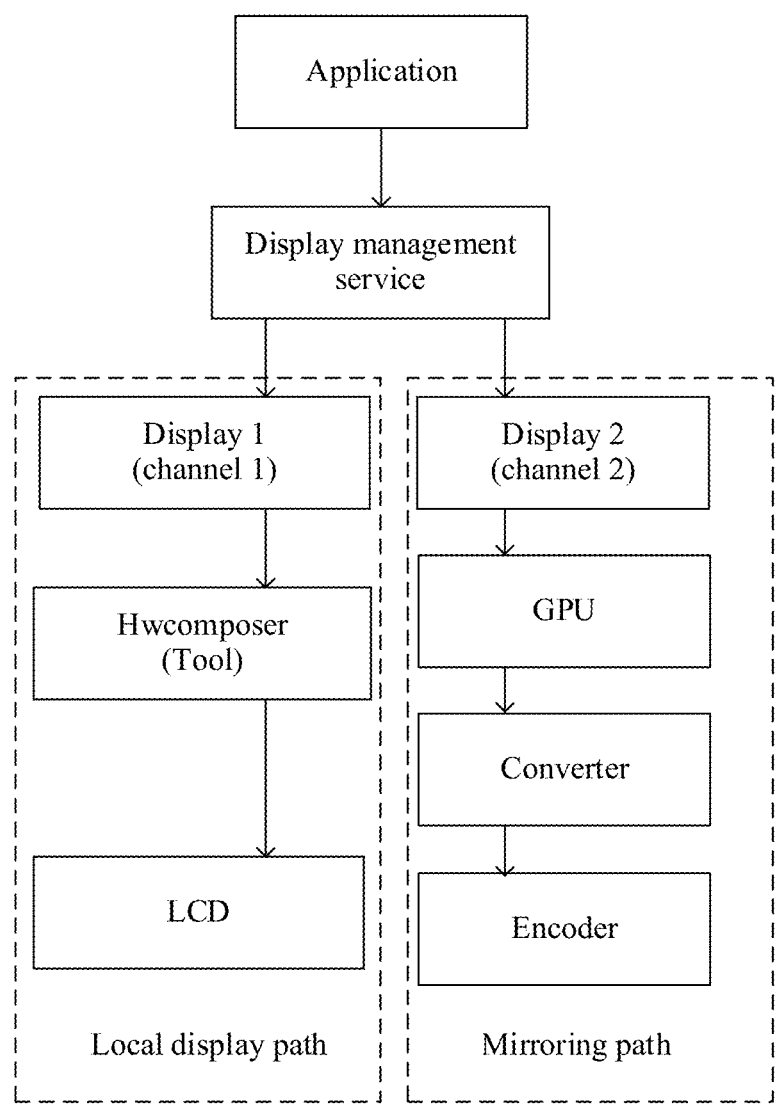
FIG. 6F is a schematic diagram of an image resource processed by the electronic device 100 and the large-screen device 200 in a mirroring process according to an embodiment of this application.

Refer to FIG. 6F. FIG. 6F shows an image resource processed by the electronic device 100 and the large-screen device 200 in a mirroring process.

As shown in FIG. 6F, the electronic device 100 runs an installed application, and the application provides an image resource. The color gamut of the image resource is a color gamut supported by the application. The application transmits the image resource to a display management service. After the display management service obtains the image resource, the image resource is separately processed through a local display path and a mirroring path, to implement local display of the electronic device 100 and mirroring from the electronic device 100 to the large-screen device 200. The image resource collected by the electronic device 100 in the step S103 is an image resource that is output by the display management service and that is provided by the application.

The following describes a method for processing the image resource through the local display path and the mirroring path.

(1) Method for processing the image resource by the electronic device 100 through the local display path.

A color gamut of an image resource displayed on the display by the electronic device 100 is the color gamut with a widest coloring range and supported by the electronic device 100, for example, P3.

It may be understood that the image resource collected by the electronic device 100 depends on an image resource that is currently played by the electronic device 100, and may be a picture in a gallery, a locally stored video, any video in a third-party video application, or the like. This is not limited herein.

For example, after the large-screen device 200 receives the user operation of the control 621A in FIG. 6D, an image resource that is collected by the electronic device 100 and that is currently displayed is the user interface 610 shown in FIG. 6A.

Figure 7A:
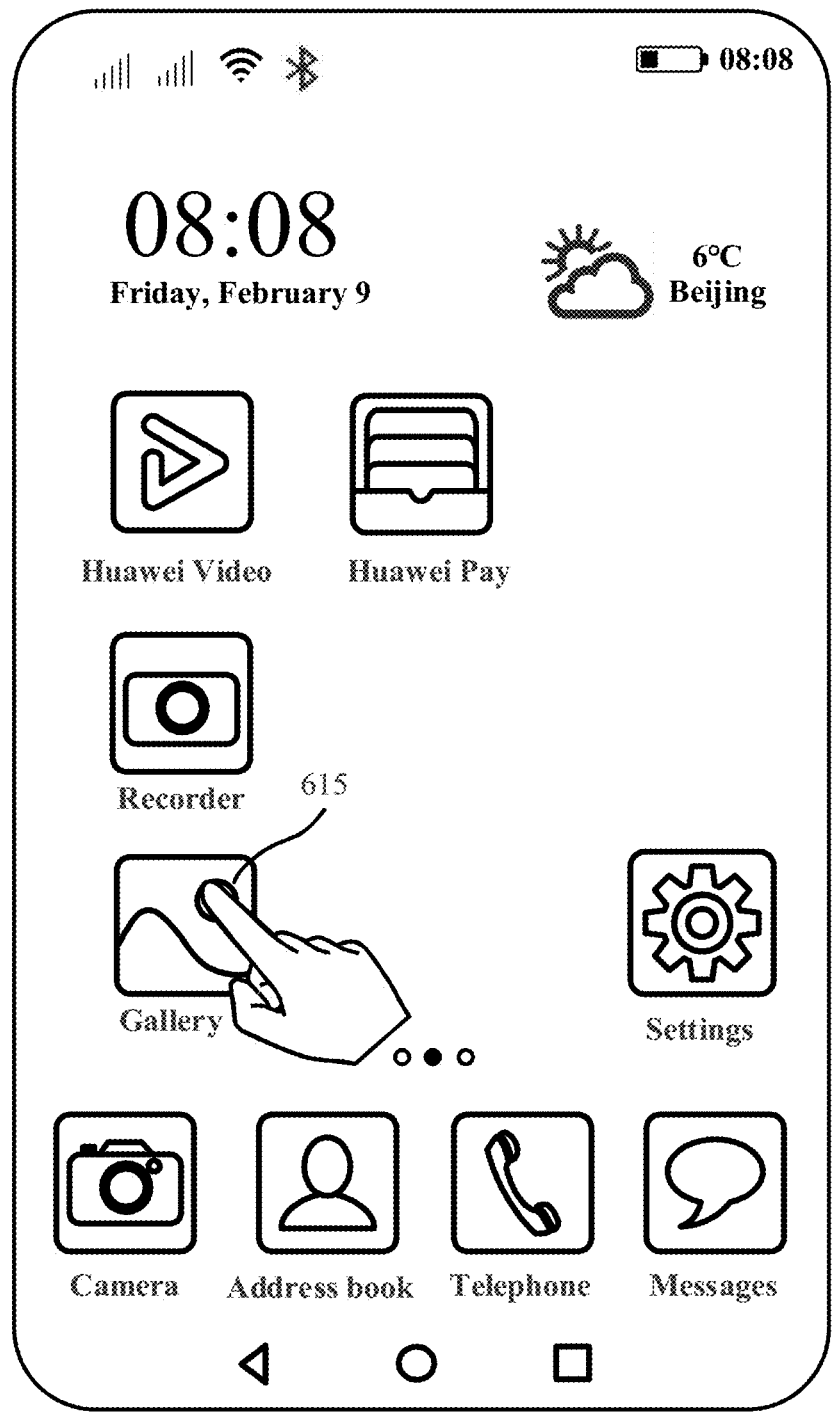
FIG. 7A to FIG. 7C are schematic diagrams of another group of user interfaces according to an embodiment of this application.
Figure 7B:
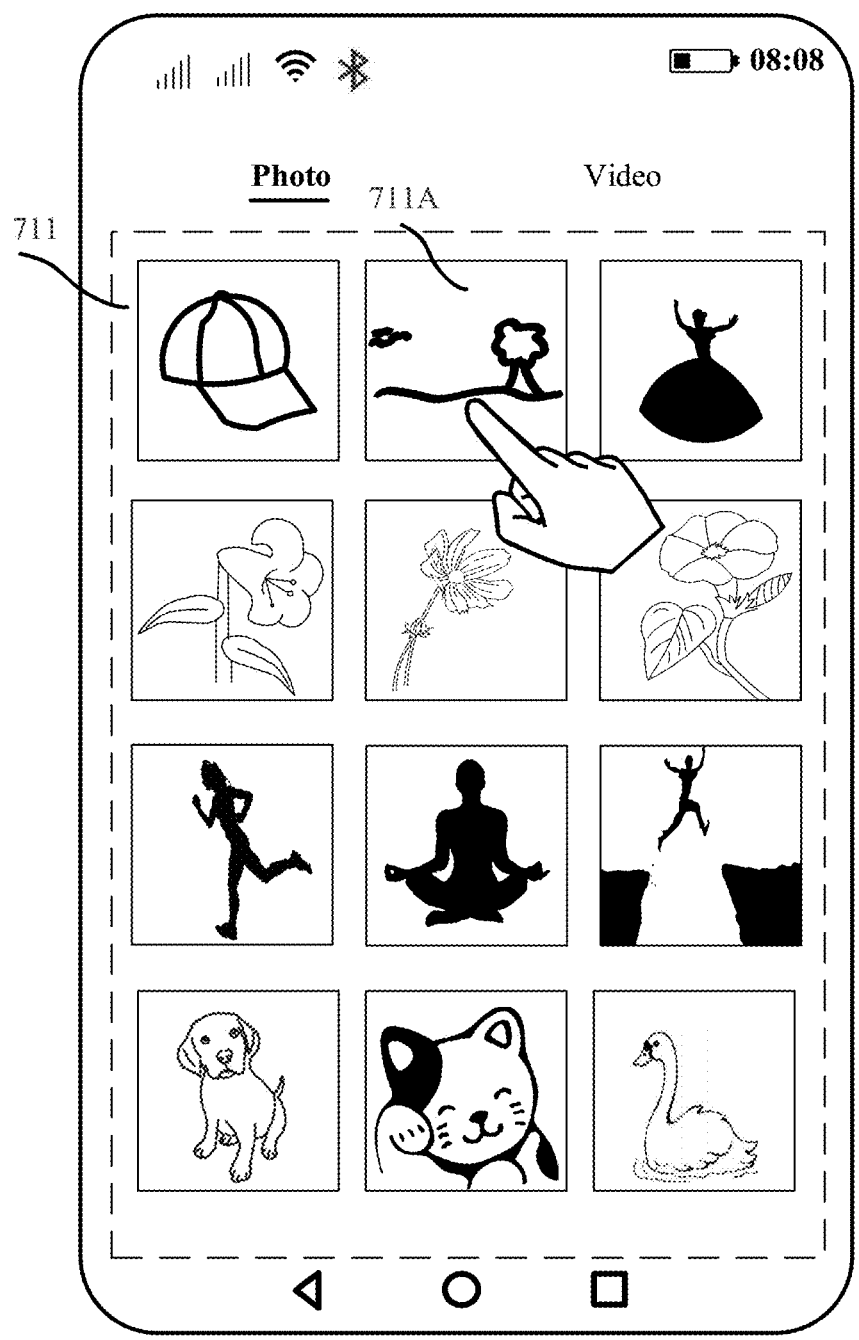

For another example, refer to FIG. 7A and FIG. 7B. After the electronic device 100 establishes the communication connection to the large-screen device 200, if the electronic device 100 responds to operations of tapping a gallery 615 and tapping a picture 711A shown in FIG. 7A and FIG. 7B, the image resource that is collected by the electronic device and that is currently displayed is a user interface 720 shown in FIG. 7C.

Figure 8A:
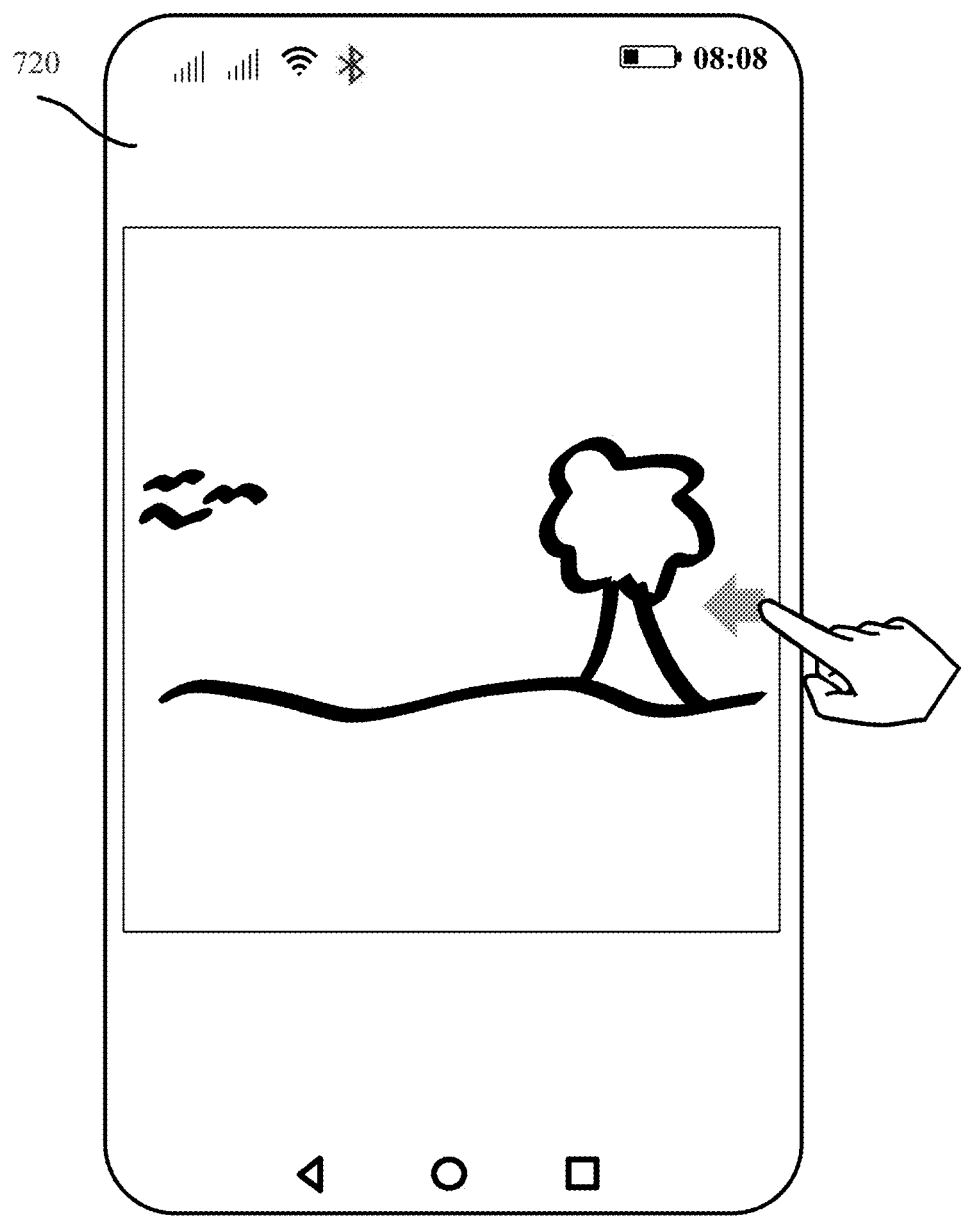
FIG. 8A to FIG. 8D are schematic diagrams of another group of user interfaces according to an embodiment of this application.
Figure 8B:
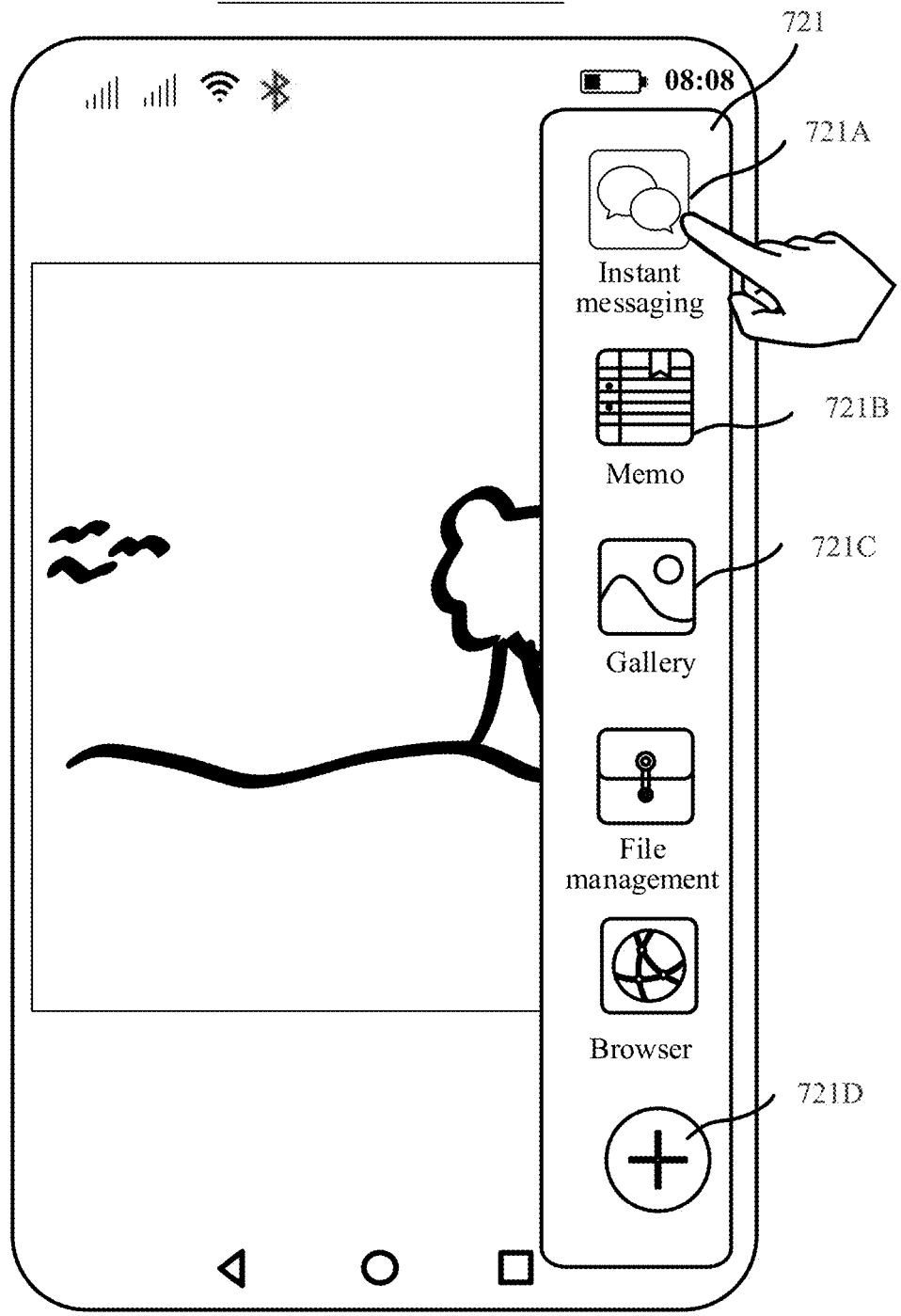
Figure 8C:
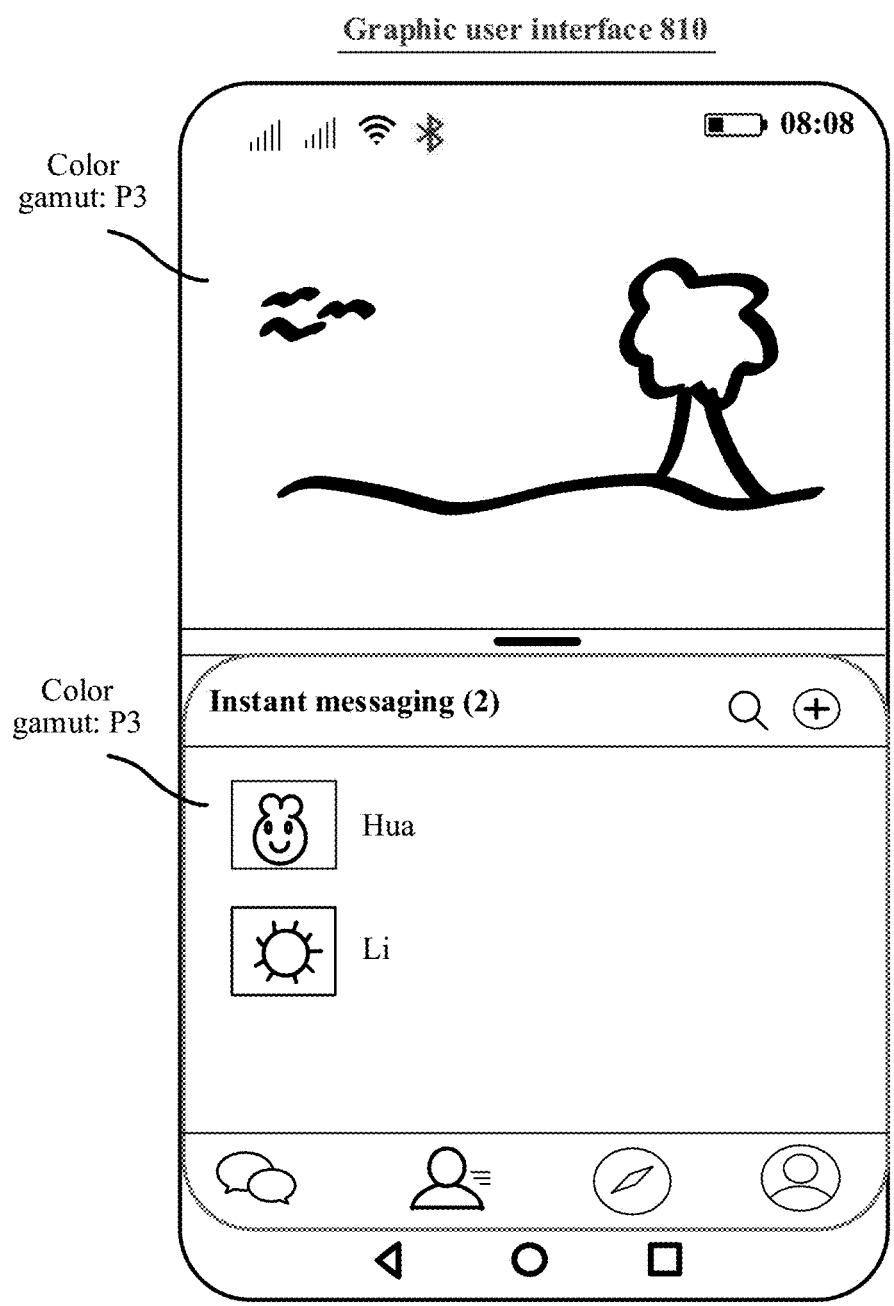

For another example, the electronic device 100 may further display the image resource in a split-screen viewing manner. For example, the image resource may include a first image resource and a second image resource. The first image resource may be provided by the first application (for example, the gallery 615), or the first image resource may be provided by the second application (for example, an instant messaging application 721A). In some embodiments, the first image resource may be provided by a first layer, and a second multimedia may be provided by a second layer. Refer to FIG. 8A to FIG. 8C. After the electronic device 100 establishes the communication connection to the large-screen device 200, if the electronic device 100 responds to the split-screen operations shown in FIG. 8A and FIG. 8B, the image resource that is collected by the electronic device 100 and that is currently displayed is an image resource displayed in a user interface 810 shown in FIG. 8C. The image resource includes the picture 711A and an image resource provided by the instant messaging application 721A. The image resource that is collected by the electronic device 100 and that is currently displayed is the image resource displayed in the user interface 810 shown in FIG. 8C.

As shown in FIG. 8A, when the electronic device 100 detects a slide left gesture on the user interface 720, the electronic device 100 may display a window 721 on the user interface 720 in response to this slide gesture. As shown in FIG. 8B, an instant messaging application icon 721A, a memo application icon 721B, a gallery application 721C, and the like may be displayed in the window 721. A control 721D may be further displayed in the window 721. The control 721D is configured to display another hidden common application. Not limited to the user interface 720 shown in FIG. 8A, the user may further input a slide left gesture on another interface, to trigger the electronic device 100 to display the window 721.

As shown in FIG. 8B, the electronic device 100 may detect a user operation of the instant messaging application icon 721A. In response to this operation, the electronic device 100 may display the user interface 810 shown in FIG. 8C.

As shown in FIG. 8C, an upper half part of the user interface 810 displays the picture 711A, and a lower half part of the user interface is provided by the instant messaging application M 721A.

A color gamut used when the electronic device 100 displays the image resource is the color gamut with a widest coloring range and supported by the electronic device 100. For example, if the color gamut supported by the electronic device 100 includes sRGB and P3, the color gamut of the displayed image resource is P3. As shown in FIG. 6A, a color gamut displayed on the user interface 610 is P3.

A color gamut of the image resource that is collected by the electronic device and that is currently displayed is a second color gamut, and the second color gamut is a color gamut supported by an application providing the image resource. For example, when the electronic device currently uses the gallery 615, an image resource provided by the gallery 615 may be P3. When the electronic device 100 displays the image resource in the split-screen viewing manner, the second color gamut includes two color gamuts: a color gamut with a widest coloring range and supported by the first application (the gallery 615), and a color gamut with a widest coloring range and supported by the second application (the instant messaging 721A). For example, the second color gamut supported by the gallery 615 is P3, and the second color gamut supported by the instant messaging application 721A is sRGB.

It may be understood that a color gamut of a current image resource displayed by the electronic device 100 and the color gamut of the image resource (the second color gamut) that is collected by the electronic device 100 and that is currently displayed may be a same color gamut, or may be different color gamut. This depends on whether a color gamut with a widest coloring range and supported by the application providing the image resource is the same as the color gamut with a widest coloring range and supported by the electronic device 100. If the two color gamuts are the same, the color gamut of the image resource displayed by the electronic device 100 and the color gamut of the collected image resource are a same color gamut. If the two color gamuts are different, the color gamut of the image resource displayed by the electronic device 100 and the color gamut of the collected image resource are different color gamuts.

(2) Method for Processing the Image Resource Through the Mirroring Path

The GPU converts the color gamut of the image resource provided by the application into the first color gamut, and sends the encoded first color gamut to the large-screen device 200. For details about color gamut conversion and sending processes of the image resource, refer to subsequent steps S104 and S105.

S104: The electronic device 100 converts the collected image resource into the first color gamut.

The electronic device 100 may convert the color gamut of the collected image resource into the first color gamut by using the GPU. Specifically, the GPU may convert the color gamut of the collected image resource into the first color gamut by using an algorithm.

In some embodiments, if the first color gamut is the same as the color gamut of the collected image resource, the electronic device 100 does not need to perform the step S104.

In some embodiments, the electronic device 100 may convert color gamuts of all collected image resources into the first color gamut. For example, after collecting the image resource collected in the user interface 610 shown in FIG. 6A, the electronic device 100 may convert the image resource into the first color gamut.

In some other embodiments, the electronic device 100 may convert a part of all collected image resources into the first color gamut, and keep collected color gamuts of the remaining part unchanged. The following describes two cases in this embodiment with reference to the accompanying drawings.

1. In the collected image resources, the electronic device 100 may convert a part of image resources selected by the user into the first color gamut, and keep the collected color gamuts of the remaining image resources unchanged.

Figure 8D:
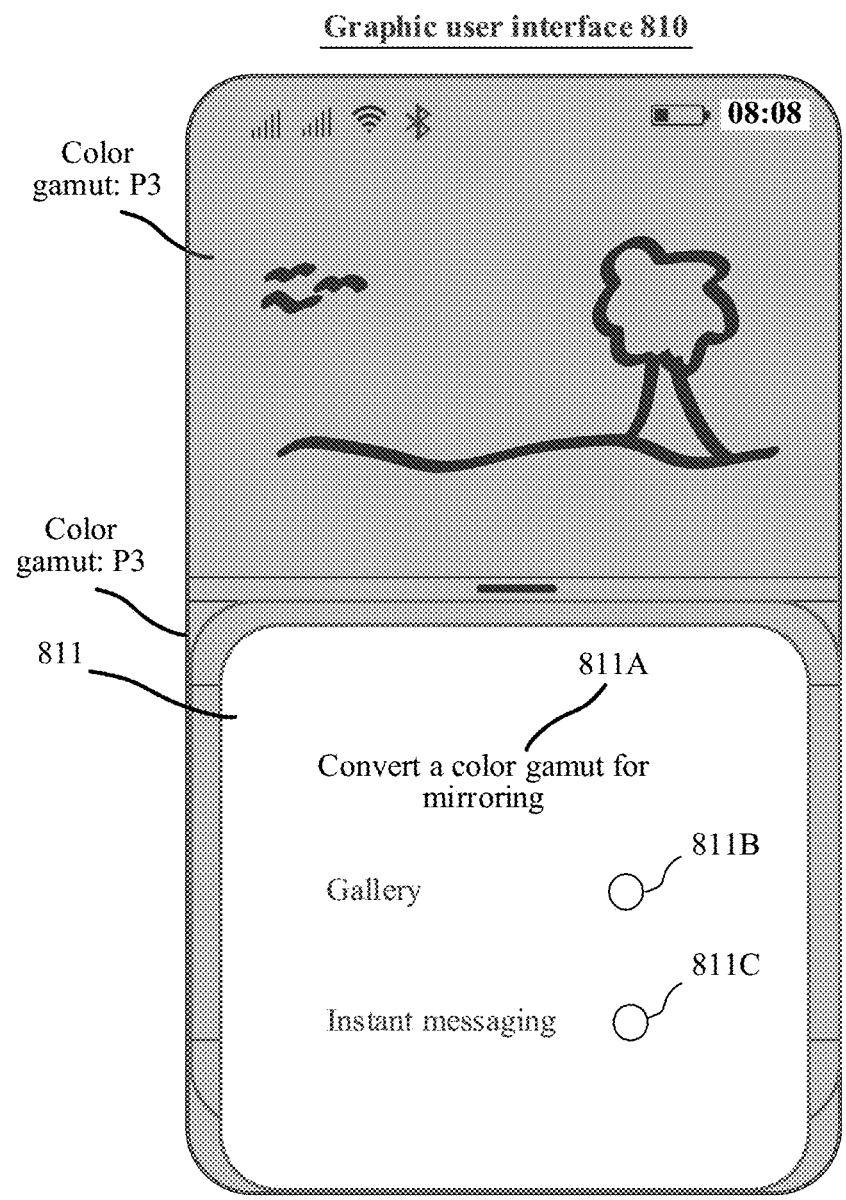

As shown in FIG. 8D, for example, the electronic device 100 converts a part of image resources (for example, the picture 711A) collected by the user into the first color gamut, and keep the collected color gamuts of the remaining image resources (for example, the image resource provided by the instant messaging 721A application) unchanged.

Specifically, when the image resources collected by the electronic device 100 are provided by the plurality of applications (for example, the user interface 810 shown in FIG. 8C), the electronic device 100 may further display a window 811 shown in FIG. 8D.

The window 811 is configured to prompt the user whether to convert color gamuts of image resources displayed in the upper half part and the lower half part of the split screen. For example, the window 811 shown in FIG. 8D includes indication information 811A, a tab 811B, and a tab 811C. The indication information 811A indicates that the user may perform color gamut conversion by using the tab 811B and/or the tab 811C. The tab 811B and the tab 811C respectively indicate a gallery and instant messaging.

As shown in FIG. 8D, the electronic device 100 may detect a user operation performed on a control 811B. In response to this user operation, the electronic device 100 may convert a color gamut of the image resource provided by the gallery into the first color gamut.

2. In the collected image resource, the electronic device 100 may convert a color gamut of some image resources set by default to the first color gamut, and keep the collected color gamut of the remaining image resources unchanged.

A part of the image resources set by default may be set by the user, or may be default settings of a mobile phone. For example, the mobile phone may set, by default, that an image resource provided by a gallery, a video APP, or a game APP needs to be converted into the first color gamut. In this way, the user may have good visual experience when the user performs mirroring by using the gallery, the video APP, and the game APP.

By conversing the color gamut of a part of the collected image resources, time of color gamut conversion may be reduced, time delay in the mirroring process may be reduced, mirroring efficiency may be improved, and a personalized requirement of the user may be met.

Considering that power consumption of the large-screen device 200 is high when the large-screen device 200 displays the image resource by using the color gamut with a wider coloring range, an embodiment of this application further provides another mirroring method. According to the method, the electronic device 100 does not convert a color gamut of status bar information in the image resource, and converts another image resource into the first color gamut. In this way, users' mirroring experience is not affected, and the power consumption of the large-screen device 200 is reduced.

In general, the electronic device 100 converts the collected image in the following several manners:

1. If the image resource collected by the electronic device 100 includes a first image resource in a second color gamut, where the first image resource is provided by the first application running on the electronic device, the electronic device converts the first image resource from the second color gamut to the first color gamut.

In some embodiments, the electronic device 100 may convert the first image resource from the second color gamut to the first color gamut in response to the first operation.

2. With reference to the first solution, if the image resource collected by the electronic device further includes a second image resource in a third color gamut, where the second image resource is provided by a second application running on the electronic device, the electronic device may further convert the second image resource from the third color gamut to the first color gamut, and synthesize the first image resource in the first color gamut with the second image resource in the first color gamut.

3. With reference to the first solution, if the image resource collected by the electronic device further includes a second image resource in a third color gamut, where the second image resource is provided by a second application running on the electronic device, the electronic device does not convert the second image resource from the third color gamut to the first color gamut, but keeps the second image resource in the third color gamut, and synthesize the first image resource in the first color gamut with the second image resource of the third color gamut.

In some embodiments, the electronic device 100 may convert the first image resource from the second color gamut to the first color gamut in response to the second operation, and does not convert the second image resource from the third color gamut to the first color gamut.

In some other embodiments, the electronic device 100 may also set by default to convert the first image resource from the second color gamut to the first color gamut, but does not convert the second image resource from the third color gamut to the first color gamut.

The control 618B shown in FIG. 6E may be referred to as a first control, and the user operation detected on the control 618B may be referred to as a first operation.

The control 811B shown in FIG. 8D may be referred to as a second control, and the control 811C may be referred to as a third control. The user operation detected on the control 811B may be referred to as a second operation.

S105: The electronic device 100 encodes the image resource that is converted into the first color gamut, and transmits the encoded image resource to the large-screen device 200 over the communication connection to the large-screen device 200.

In some embodiments, if the image resources collected by the electronic device 100 are provided by the plurality of applications, the electronic device 100 needs to synthesize the image resources after performing the step S104, and then encodes the image resources.

Specifically, the electronic device 100 may encode, that is, compress, the image resource that is converted into the first color gamut. An encoding format used during encoding may be the encoding/decoding format negotiated by the electronic device 100 and the large-screen device 200 in the step S102, or may be a default encoding/decoding format. This is not limited herein.

In some embodiments, the electronic device 100 may further send the first color gamut to the large-screen device 200 while transmitting the compressed image resource to the large-screen device 200.

In a specific implementation, the electronic device 100 may first encode the image resource that converted into the first color gamut to obtain an elementary stream (elementary stream, ES), extend a color gamut field in the ES, use the color gamut field to carry the first color gamut, encapsulate the ES stream into a transport stream (transport stream, TS), and transmit the TS to the large-screen device 200. That is, the electronic device 100 and the large-screen device 200 may transmit the image resource in a form of streaming media.

S106: The large-screen device 200 receives the image resource that is sent by the electronic device 100, decompresses the image resource, and displays the decompressed image resource in the first color gamut.

An encoding/decoding format used for decompression includes but is not limited to MPEG-1, MPEG-2, MPEG-3, MPEG-4, H.261, H.263, H.264, and the like.

In some embodiments, the large-screen device 200 may display the decompressed image resource based on the first color gamut.

The large-screen device 200 may obtain the first color gamut in the following three manners:

(1) After the electronic device 100 determines the first color gamut, the electronic device 100 sends the first color gamut to the large-screen device 200. For details, refer to the step S102 described above. Details are not described herein again.

(2) The large-screen device 200 determines the first color gamut. For details, refer to the step S102 described above. Details are not described herein again.

(3) The electronic device 100 sends the first color gamut and the image resource to the large-screen device 200.

FIG. 9A to FIG. 9F show examples of image resources separately displayed by the large-screen device 200 when the electronic device 100 displays different user interfaces.

Figure 9A:
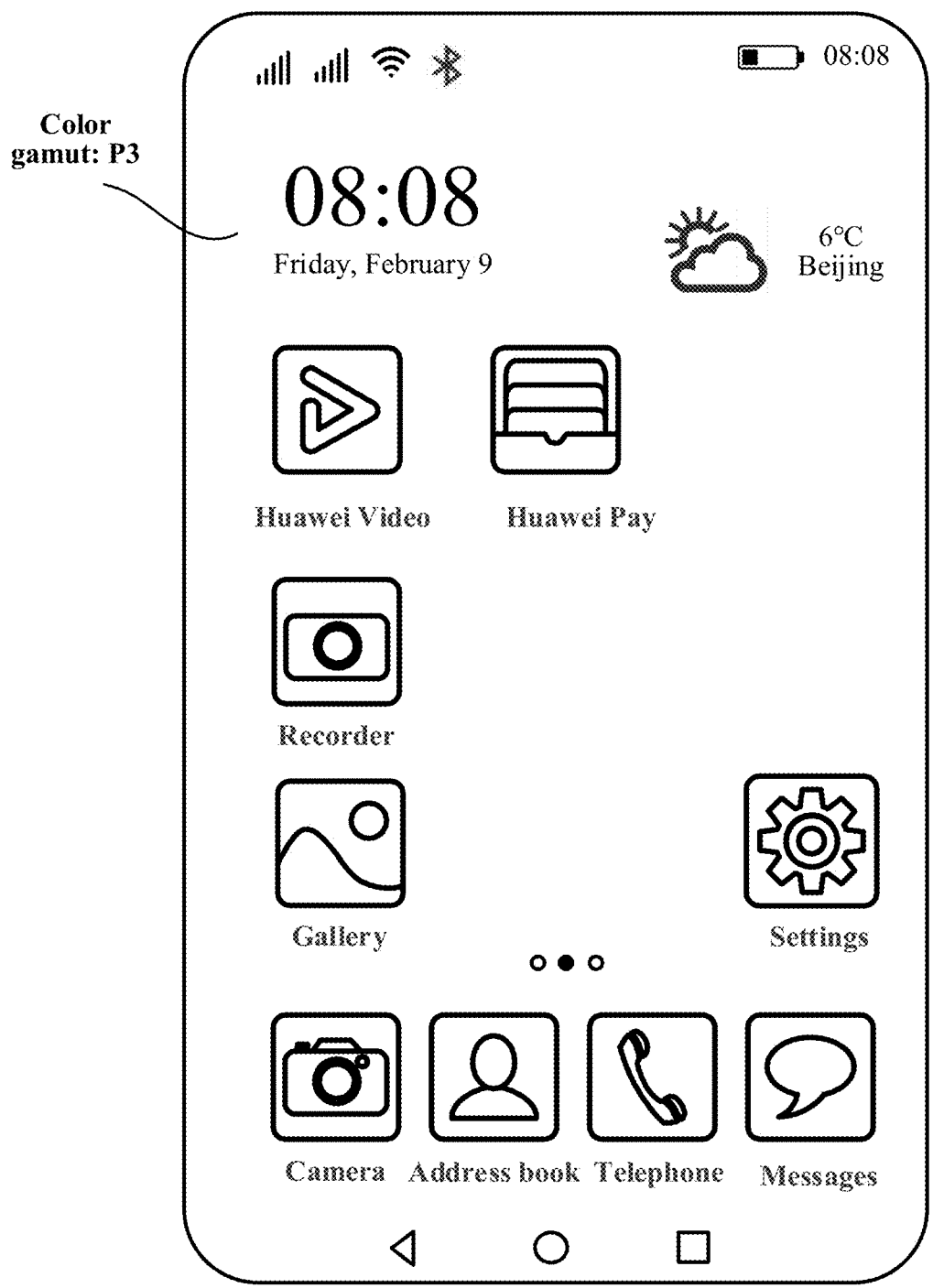
FIG. 9A to FIG. 9F are schematic diagrams of another group of user interfaces according to an embodiment of this application.

As shown in FIG. 9A, if a color gamut of the image resource displayed by the electronic device 100 is P3, the user interface 610 shown in FIG. 9A is consistent with the user interface 610 shown in FIG. 6A.

Figure 9B:
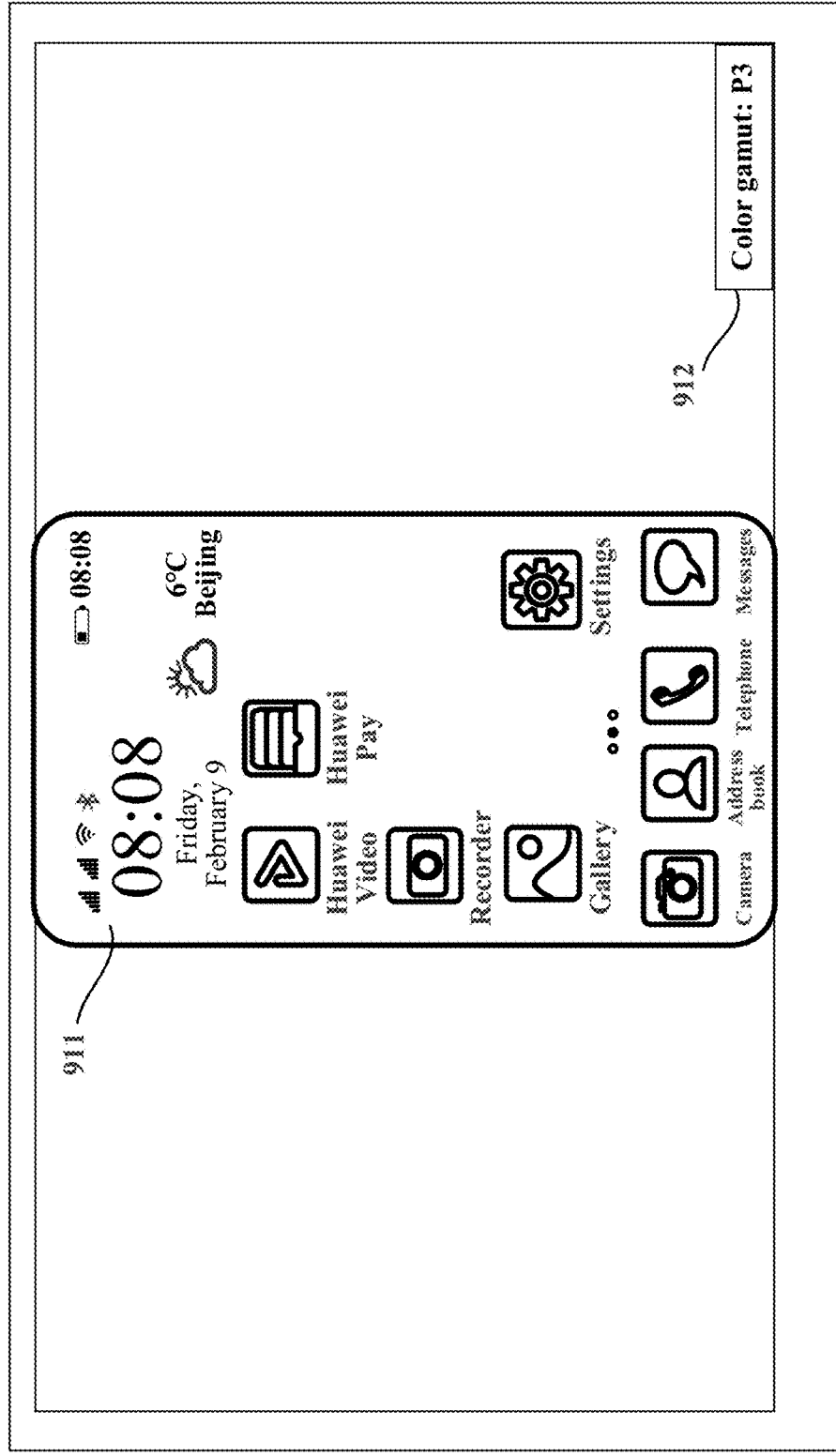

As shown in FIG. 9B, the large-screen device 200 displays an image resource 911 and a color gamut identifier 912. The image resource 911 is an image resource that is in the user interface 610 shown in FIG. 9A and that is collected by the electronic device 100. The color gamut identifier 912 may indicate a color gamut of an image resource that is currently displayed by the large-screen device 200, for example, P3.

Compared with FIG. 9A and FIG. 9B, the color gamut of the image resource displayed by the electronic device 100 shown in FIG. 9A is P3, and a color gamut of the image resource 911 displayed by the large-screen device 200 shown in FIG. 9B is P3. It can be learned that according to the mirroring method provided in this embodiment of this application, a loss of color information in the mirroring process may be reduced, and consistency of display effect of image resources on an electronic device end and a large-screen device end may be improved.

Figure 7C:
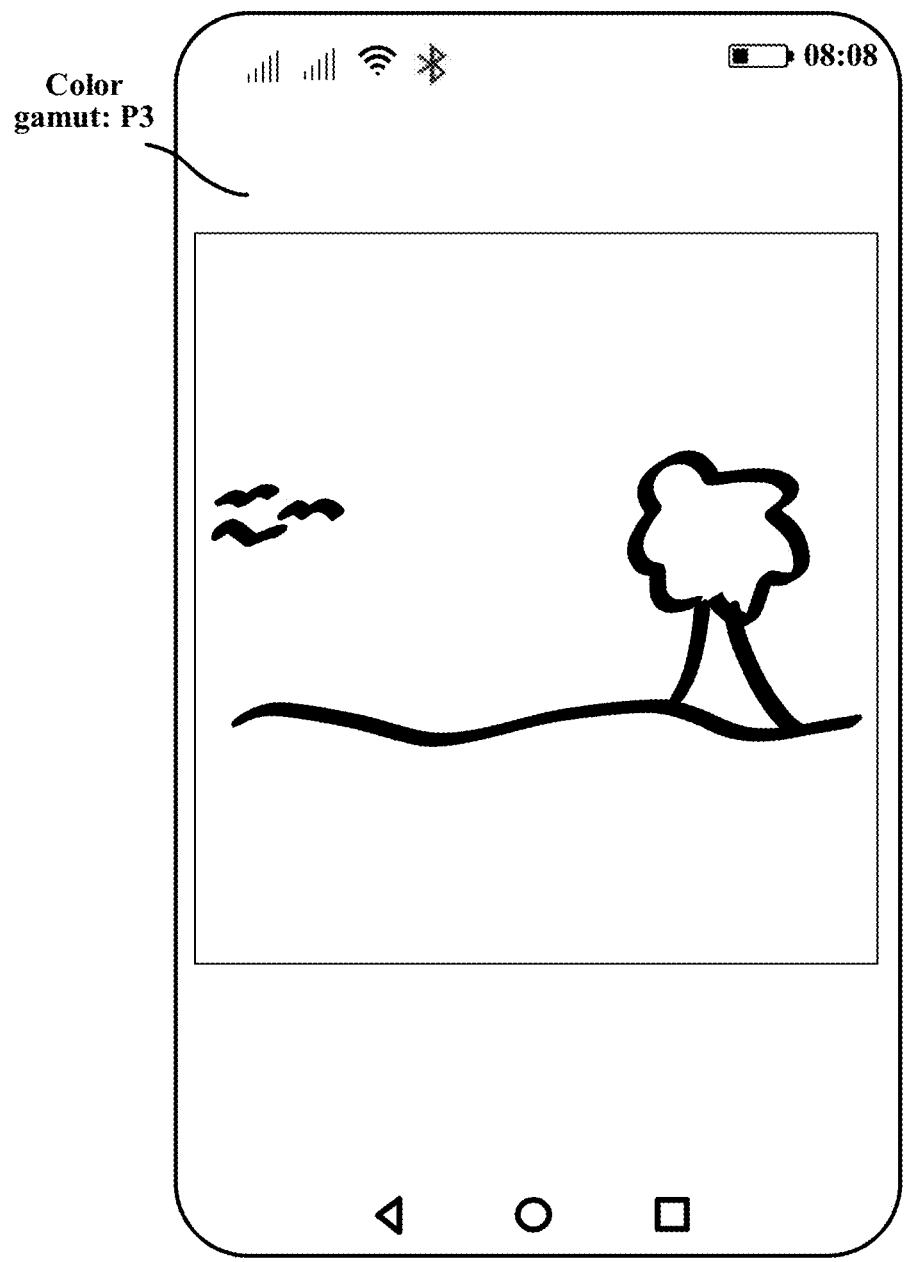
Figure 9C:
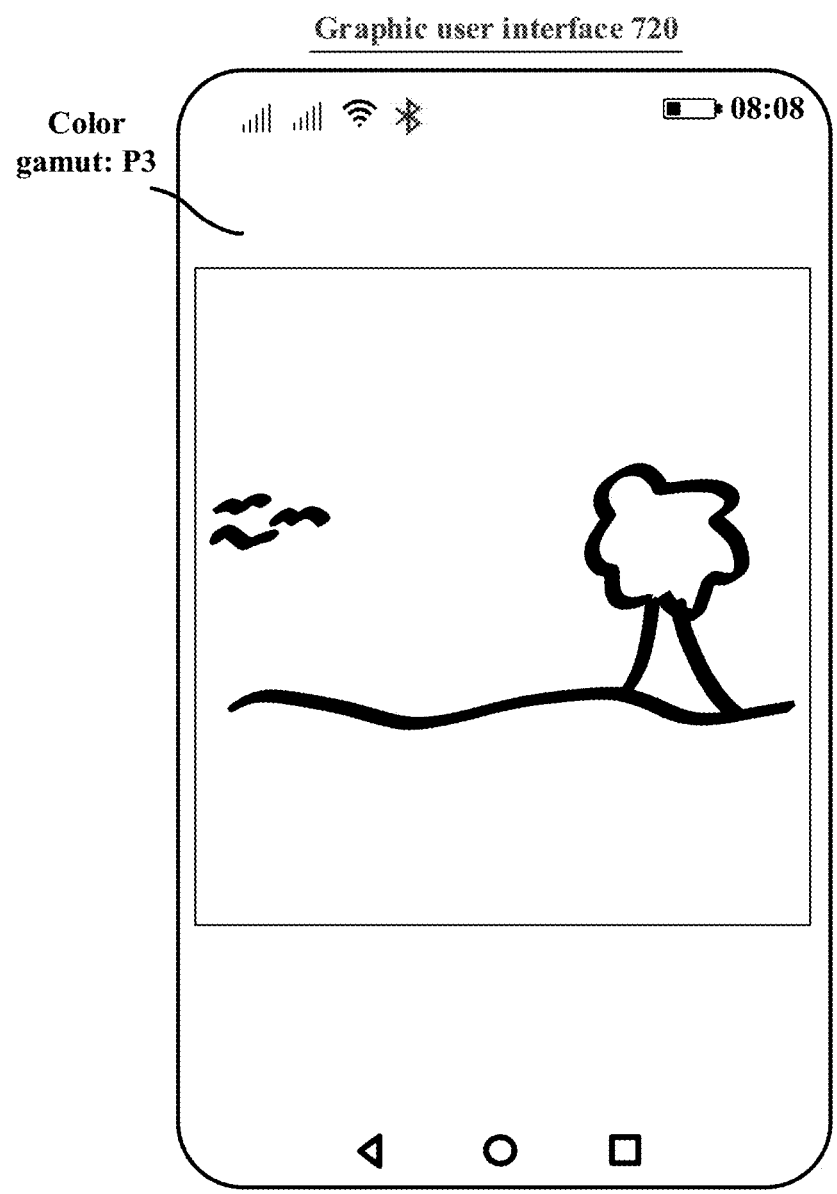

As shown in FIG. 9C, if the color gamut of the image resource displayed by the electronic device 100 is P3, the user interface 720 shown in FIG. 9C is consistent with the user interface 720 shown in FIG. 7C.

Figure 9D:
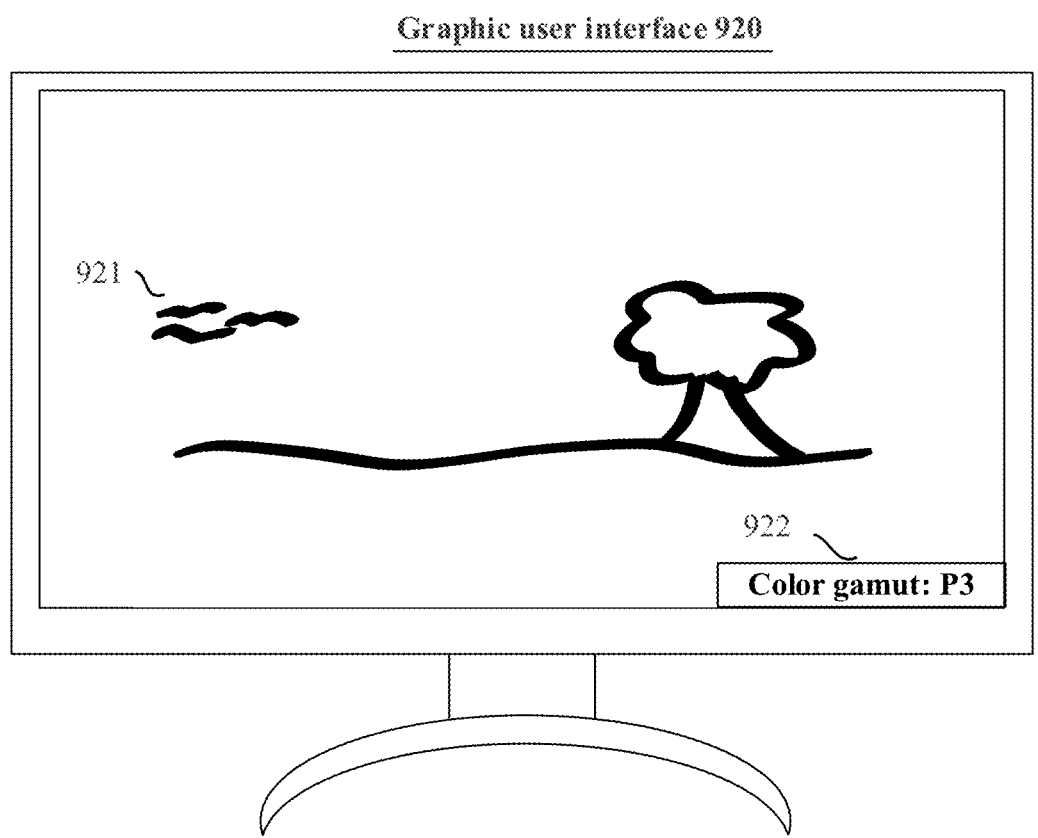

As shown in FIG. 9D, the large-screen device 200 displays an image resource 921 and a color gamut identifier 922. The image resource 921 is an image resource that is in the user interface 720 shown in FIG. 7C and that is collected by the electronic device 100. The color gamut identifier 922 may indicate the color gamut of the image resource currently displayed by the large-screen device 200, for example, P3.

By comparing FIG. 9C with FIG. 9D, the color gamut of the image resource displayed by the electronic device 100 shown in FIG. 9C is P3, and the color gamut of the image resource displayed by the large-screen device 200 shown in FIG. 9D is P3. It can be learned that according to the mirroring method provided in this embodiment of this application, the loss of color information in the mirroring process may be reduced, and the consistency of the display effect of the image resources on the electronic device end and the large-screen device end may be improved.

Figure 9E:
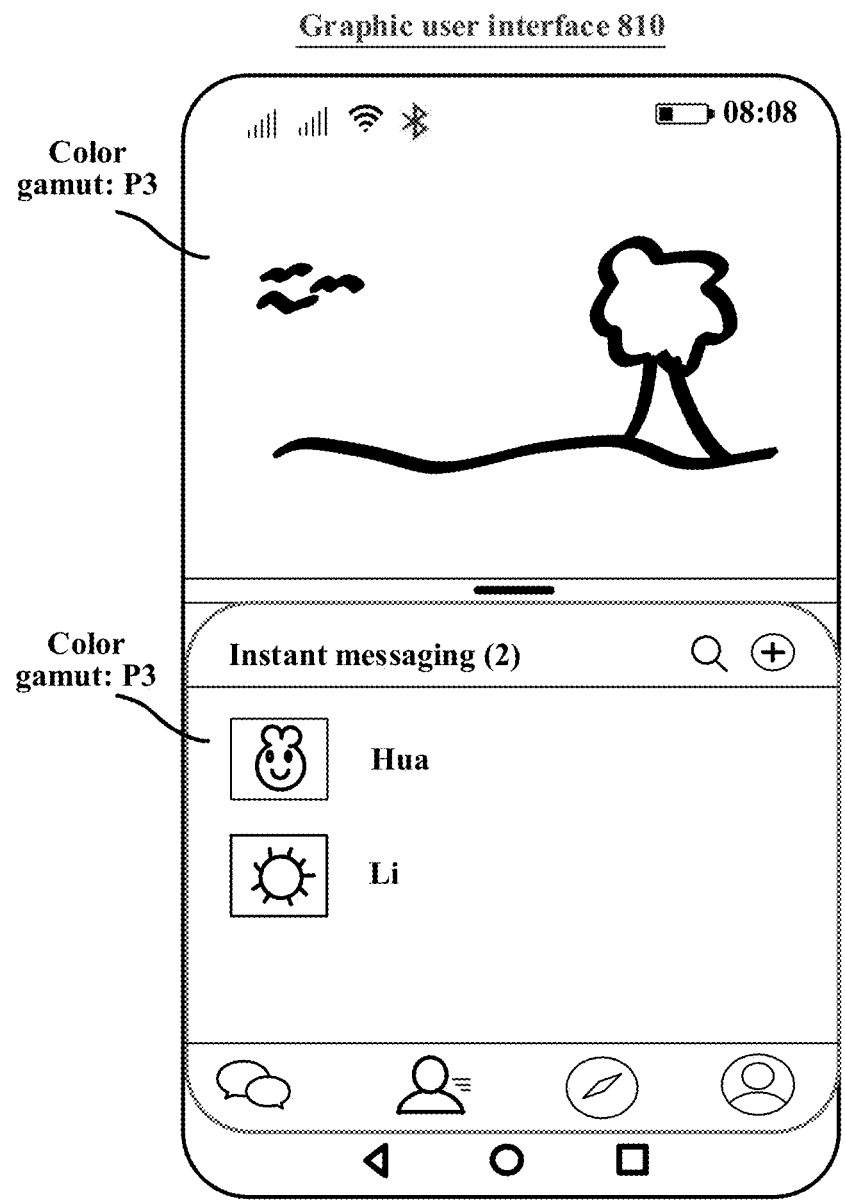

As shown in FIG. 9E, a color gamut of the first image resource displayed by the electronic device 100 is P3, and a color gamut of the second image resource displayed by the electronic device 100 is sRGB. The user interface 810 shown in FIG. 9E is consistent with the user interface 810 shown in FIG. 8C.

Figure 9F:
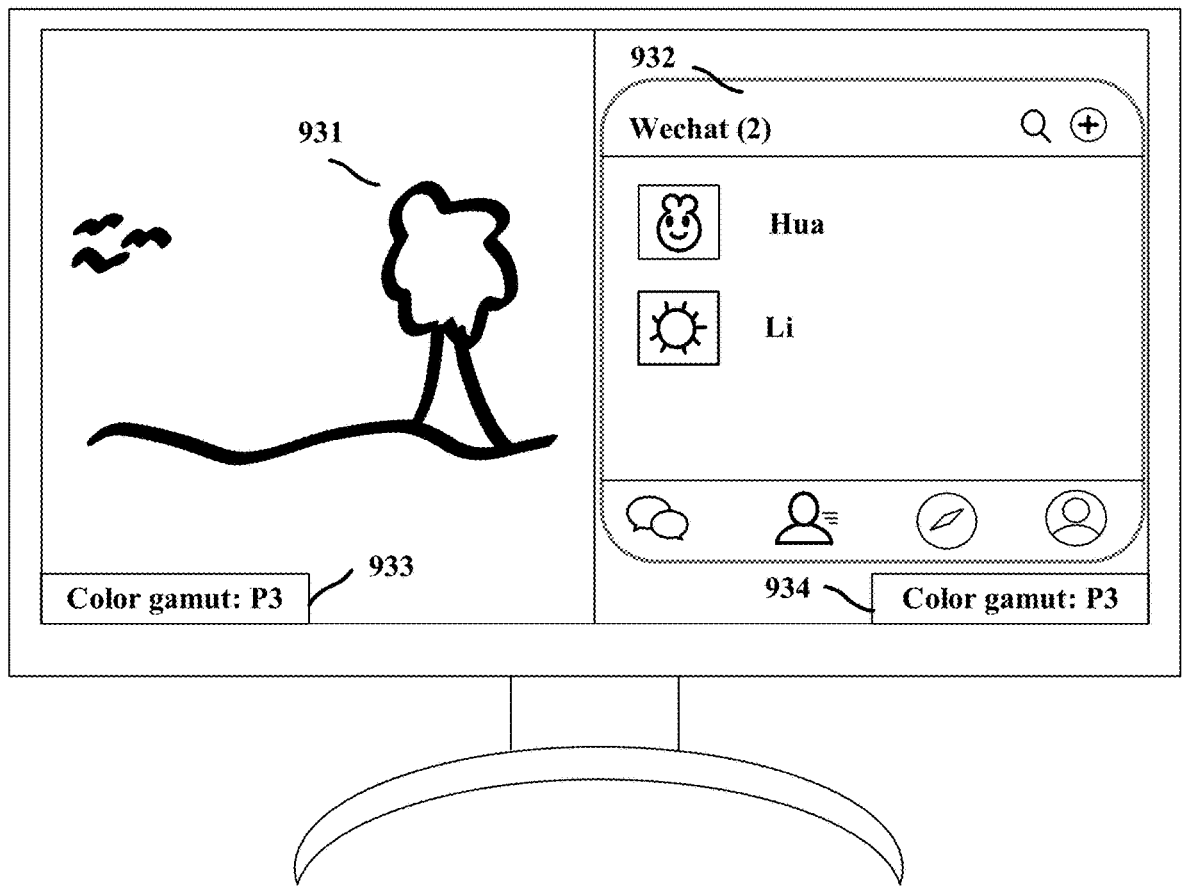

As shown in FIG. 9F, the large-screen device 200 displays a first image resource 931, a second image resource 932, an identifier 933 of the first color gamut, and an identifier 934 of the first color gamut. The first image resource 931 is a first image resource (for example, the picture 711A) that is in the user interface 810 shown in FIG. 9E and that is collected by the electronic device 100. The second image resource 932 is a second image resource (for example, the image resource provided by an instant application 721A) that is in the user interface 810 shown in FIG. 9E and that is collected by the electronic device 100. The first color gamut identifier 933 may indicate a color gamut that is of the first image resource and that is currently displayed by the large-screen device 200, for example, P3. The identifier 934 of the first color gamut may indicate a color gamut that is of the second image resource and that is currently displayed by the large-screen device 200, for example, P3.

Compared with FIG. 9E and FIG. 9F, as shown in FIG. 9E, the color gamut of the first image resource displayed by the electronic device 100 is P3, and the color gamut of the second image resource displayed by the electronic device 100 is P3; and as shown in FIG. 9F, a color gamut of the first image resource displayed by the large-screen device 200 is P3, and the color gamut of the second image resource displayed by the large-screen device 200 is P3. It can be learned that according to the mirroring method provided in this embodiment of this application, the loss of color information in the mirroring process may be reduced, and the consistency of the display effect of the image resources on the electronic device end and the large-screen device end may be improved.

Based on the descriptions of FIG. 9A to FIG. 9F, it can be learned that after the mirroring method provided in this embodiment of this application is used, a color difference between the image resources displayed on the electronic device 100 and the large-screen device 200 is reduced in the mirroring process. This improves users' visual experience in the mirroring process.

In general, if the large-screen device 200 receives the first image resource in the first color gamut, the large-screen device 200 displays the first image in the first color gamut. If the large-screen device 200 receives the first image resource and the second image resource in the first color gamut, the large-screen device 200 displays the first image resource and the second graphics resource in the first color gamut. If the large-screen device 200 receives the first image resource in the first color gamut and the second image resource of the third color gamut, the large-screen device 200 displays the first image resource in the first color gamut, and displays the second image resource in the third color gamut.

In some embodiments, the large-screen device 200 may display the decompressed image resource in full screen as shown in FIG. 9B and FIG. 9C.

In some other embodiments, the large-screen device 200 may alternatively display the decompressed image resource on a partial area of the display as shown in FIG. 9A. This is not limited in this embodiment of this application.

Not limited to mirroring methods during one-to-one mirroring as shown in FIG. 6A to FIG. 6E, FIG. 7A to FIG. 7C, FIG. 8A to FIG. 8D, and FIG. 9A to FIG. 9F, the mirroring method provided in this embodiment of this application may be further applied to a one-to-many mirroring scenario.

Figure 10:
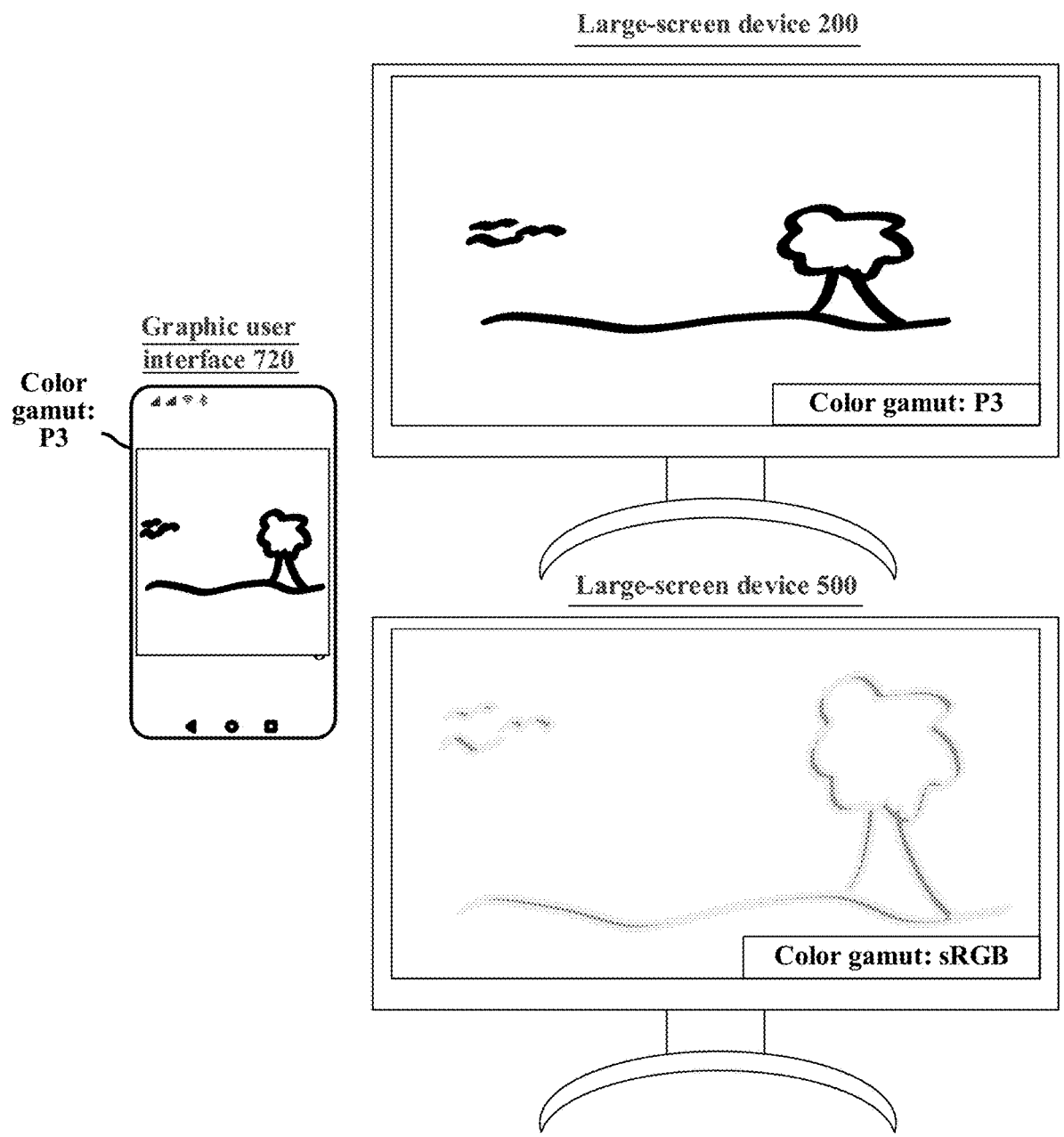
FIG. 10 is a schematic diagram of a one-to-many mirroring scenario according to an embodiment of this application.

As shown in FIG. 10, for example, in a one-to-many mirroring scenario, the electronic device 100 may separately establish a communication connection to a plurality of large-screen devices. For example, the electronic device 100 establishes a first communication connection to the large-screen device 200, and the electronic device 100 establishes a second communication connection to the large-screen device 500. Over the first communication connection, the first color gamut that is obtained through negotiation between the electronic device 100 and the large-screen device 200 and that is used during mirroring may be P3. Over the second communication connection, the first color gamut that is obtained through negotiation between the electronic device 100 and the large-screen device 500 and that is used during mirroring may be sRGB.

In the one-to-many mirroring scenario shown in FIG. 10, for a process of establishing the first communication connection between the electronic device 100 and the large-screen device 200 and a process of establishing the second communication connection between the electronic device 100 and the large-screen device 500, refer to the step S101 described above. Details are not described herein again.

In the one-to-many mirroring scenario shown in FIG. 10, the electronic device 100 may separately negotiate with a plurality of large-screen devices (for example, the large-screen device 200 and the large-screen device 500) about a color gamut used during mirroring. The color gamut that is obtained through negotiation between the electronic device 100 and the large-screen device 200 and that is used during mirroring may be the same as or different from the color gamut that is obtained through negotiation between the electronic device 100 and the large-screen device 500. For the negotiated color gamut used during mirroring, refer to the step S102 described above. Details are not described herein again.

The electronic device 100 converts the collected image resource from the first color gamut to the negotiated color gamut. When the color gamut obtained through negotiation between the electronic device 100 and the plurality of large-screen devices is a same color gamut, the electronic device 100 converts a color gamut of the collected image resource into an image resource of the same color gamut. When there are different color gamuts obtained through negotiation between the electronic device 100 and the plurality of large-screen devices, the electronic device 100 separately converts the collected image resource in the color gamut into a plurality of image resources in the different color gamuts. For a color gamut conversion process, refer to the step S103 described above. Details are not described herein again.

The electronic device 100 collects an image resource that is currently displayed. For a method for collecting the image resource, refer to the step S104 described above. Details are not described herein again.

The electronic device 100 encodes (compresses) the converted image resource and sends the image resource to a plurality of large-screen devices. The electronic device 100 may send all encoded image resources to the large-screen device 200 and the large-screen device 500, or may send an image resource in a corresponding color gamut based on a color gamut that is separately supported by the large-screen device 200 and the large-screen device 500. For a process of encoding the image resource, refer to the step S105 described above. Details are not described herein again.

After receiving the encoded image resource, the large-screen device 200 decodes (decompresses) the image resource, and displays the image resource based on the negotiated color gamut. When the large-screen device 200 and the large-screen device 500 receive a plurality of image resources in different color gamuts and sent by the electronic device 100, the large-screen device 200 and the large-screen device 500 decompress and display only an image resource in the corresponding color gamut supported by the large-screen device 200 and the large-screen device 500. For a specific method for decompressing and displaying the image resource, refer to the step S106 described above. Details are not described herein again.

In the one-to-many mirroring scenario, diversified mirroring may be implemented based on color gamut capabilities supported by different large-screen devices, that is, different large-screen devices may display, in a same color gamut or different color gamuts, an image resource shared by the electronic device 100.

An embodiment of this application further provides an electronic device. The electronic device includes one or more processors and one or more memories. The one or more memories are coupled to the one or more processors, and the one or more memories are configured to store computer program code. The computer program code includes computer instructions. When the one or more processors execute the computer instructions, the electronic device is enabled to perform the method described in the foregoing embodiments.

An embodiment of this application further provides a computer program product including instructions. When the computer program product runs on an electronic device, the electronic device is enabled to perform the method described in the foregoing embodiment.

An embodiment of this application further provides a computer-readable storage medium, including instructions. When the instructions are run on an electronic device, the electronic device is enabled to perform the method described in the foregoing embodiment.

It may be understood that the implementations of this application may be randomly combined to achieve different technical effects.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

In summary, what is described above is merely embodiments of the technical solutions of this application, but is not intended to limit the protection scope of this application. Any modification, equivalent replacement, or improvement made based on the disclosure of this application shall fall within the protection scope of this application.

What is claimed is:

1. A method applicable to an electronic device for communication with a large-screen device, the method comprising:
    establishing a communication connection between the electronic device and the large-screen device;
    negotiating a first color gamut over the communication connection, the first color gamut being a color gamut having a widest coloring range supported by both the electronic device and the large-screen device;
    collecting, by the electronic device, an image resource comprising a first image resource in a second color gamut, the first image resource being provided by a first application running on the electronic device;
    converting, by the electronic device, the first image resource from the second color gamut to the first color gamut;
    displaying the first image resource on a display of the electronic device; and
    sending the first image resource in the first color gamut to the large-screen device.

2. The method according to claim 1, wherein after establishing the communication connection to the large-screen device and before the converting the first image resource from the second color gamut to the first color gamut, the method further comprises:
    displaying, by the electronic device, prompt information and a first control providing an option to select the first color gamut for mirroring; and
    converting, by the electronic device, the first image resource from the second color gamut to the first color gamut comprises detecting, by the electronic device, a first operation performed on the first control and converting the first image resource from the second color gamut to the first color gamut.

3. The method according to claim 1, wherein the image resource collected by the electronic device comprises a second image resource in a third color gamut, the second image resource being provided by a second application running on the electronic device; and before sending the first image resource to the large-screen device, the method further comprises:
converting, by the electronic device, the second image resource from the third color gamut to the first color gamut; and
the sending the first image resource to the large-screen device comprises synthesizing, by the electronic device, the first image resource in the first color gamut with the second image resource in the first color gamut, and sending a synthesized resource to the large-screen device; and
displaying, by the large-screen device, the second image resource in the first color gamut.

4. The method according to claim 1, wherein the image resource collected by the electronic device further comprises a second image resource in a third color gamut, the second image resource provided by a second application running on the electronic device;

the sending the first image resource to the large-screen device comprises synthesizing the first image resource in the first color gamut with the second image resource in the third color gamut, and sending a synthesized resource to the large-screen device; and
the method further comprises displaying, by the large-screen device, the second image resource in the third color gamut.

5. The method according to claim 4, wherein before converting the first image resource from the second color gamut to the first color gamut, the method further comprises:
displaying, by the electronic device, a second control and a third control, wherein the second control corresponds to the first image resource and the third control corresponds to the second image resource; and
the converting the first image resource from the second color gamut to the first color gamut comprises detecting a second operation performed on the second control and converting the first image resource from the second color gamut to the first color gamut.

6. The method according to claim 1, wherein the negotiating a first color gamut over the communication connection comprises:
sending a first message to the large-screen device over the communication connection, the first message including an instruction to query a color gamut supported by the large-screen device;
sending, by the large-screen device, a second message to the electronic device, the second message carrying information about the color gamut supported by the large-screen device; and
determining, by the electronic device, the first color gamut based on a color gamut supported by the electronic device and the color gamut supported by the large-screen device.

7. The method according to claim 6, wherein after determining the first color gamut, the method further comprises:
sending, by the electronic device, a third message to the large-screen device carrying information about the first color gamut.

8. The method according to claim 1, wherein:
the sending, by the electronic device, the first image resource in the first color gamut to the large-screen device comprises encoding, by the electronic device, the first image resource in the first color gamut to obtain a transport stream and sending the transport stream to the large-screen device; and
the displaying, by the large-screen device, the first image resource in the first color gamut comprises decoding, by the large-screen device, the transport stream to obtain the first image resource in the first color gamut and displaying the first image resource in the first color gamut.

9. A method applicable to an electronic device, the method comprising:
establishing a communication connection to a large-screen device;
negotiating with the large-screen device about a first color gamut over the communication connection, the first color gamut being a color gamut having a widest coloring range supported by both the electronic device and the large-screen device;
collecting, by the electronic device, an image resource comprising a first image resource in a second color gamut, the first image resource being provided by a first application running on the electronic device;
displaying, by the electronic device, prompt information and a first control providing an option to select the first color gamut for mirroring; and
converting, by the electronic device, the first image resource from the second color gamut to the first color gamut comprises detecting, by the electronic device, a first operation performed on the first control and converting the first image resource from the second color gamut to the first color gamut;
converting, by the electronic device, the first image resource from the second color gamut to the first color gamut;
displaying the first image resource on a display of the electronic device; and
sending the first image resource in the first color gamut to the large-screen device.

10. The method according to claim 9, wherein the image resource collected by the electronic device comprises a second image resource in a third color gamut, the second image resource being provided by a second application running on the electronic device;
before sending the first image resource to the large-screen device, the method further comprises converting, by the electronic device, the second image resource from the third color gamut to the first color gamut; and
the sending the first image resource to the large-screen device comprises synthesizing, by the electronic device, the first image resource in the first color gamut with the second image resource in the first color gamut, and sending a synthesized resource to the large-screen device.

11. The method according to claim 9, wherein the image resource collected by the electronic device further comprises a second image resource in a third color gamut, the second image resource being provided by a second application running on the electronic device; and
the sending the first image resource to the large-screen device comprises synthesizing, by the electronic device, the first image resource in the first color gamut with the second image resource of the third color gamut, and sending a synthesized resource to the large-screen device.

12. The method according to claim 11, wherein before the converting, by the electronic device, the first image resource from the second color gamut to the first color gamut, the method further comprises:

displaying, by the electronic device, a second control and a third control, wherein the second control corresponds to the first image resource and the third control corresponds to the second image resource; and the converting, by the electronic device, the first image resource from the second color gamut to the first color gamut comprises detecting, by the electronic device, a second operation performed on the second control, and converting the first image resource from the second color gamut to the first color gamut.

13. The method according to claim 9, wherein the sending, by the electronic device, the first image resource in the first color gamut to the large-screen device comprises:

sending, by the electronic device, the first image resource in the first color gamut and the first color gamut to the large-screen device.

14. The method according to claim 9, wherein the negotiating, by the electronic device, with the large-screen device about a first color gamut over the communication connection comprises:

sending, by the electronic device, a first message to the large-screen device over the communication connection, wherein the first message includes an instruction to query a color gamut supported by the large-screen device;

receiving, by the electronic device, a second message sent by the large-screen device, wherein the second message carries the color gamut supported by a large-screen device; and determining, by the electronic device, the first color gamut based on a color gamut supported by the electronic device and the color gamut supported by the large-screen device.

15. The method according to claim 14, wherein after the determining, by the electronic device, the first color gamut, the method further comprises:

sending, by the electronic device, a third message to the large-screen device, wherein the third message carries information about the first color gamut.

16. The method according to claim 9, wherein the sending, by the electronic device, the first image resource in the first color gamut to the large-screen device comprises encoding, by the electronic device, the first image resource in the first color gamut to obtain a transport stream, and sending the transport stream to the large-screen device.

17. The method according to claim 9, wherein a coloring range of the first color gamut is greater than a coloring range of the second color gamut.

18. An electronic device, comprising:
one or more processors; and
one or more memories coupled to the one or more processors and storing computer program code including computer instructions that, when executed by the one or more processors, enables the electronic device to perform operations including:

establishing a communication connection between the electronic device and a large-screen device;

negotiating a first color gamut over the communication connection, the first color gamut being a color gamut having a widest coloring range supported by both the electronic device and the large-screen device;

collecting an image resource comprising a first image resource in a second color gamut, the first image resource being provided by a first application running on the electronic device;

converting the first image resource from the second color gamut to the first color gamut;

displaying the first image resource on a display of the electronic device; and sending the first image resource in the first color gamut to the large-screen device.

19. A method applied to an electronic device, the method comprising:

establishing, by the electronic device, a communication connection to a large-screen device;

negotiating, by the electronic device, with the large-screen device about a first color gamut over the communication connection, wherein the first color gamut is a color gamut with a widest coloring range and supported by both the electronic device and the large-screen device;

collecting, by the electronic device, an image resource, wherein the image resource comprises a first image resource and a second image resource, the first image resource being in a second color gamut and provided by a first application running on the electronic device, and the second image resource being in a third color gamut and provided by a second application running on the electronic device;

converting, by the electronic device, the first image resource from the second color gamut to the first color gamut, and converting the second image resource in the third color gamut to the first color gamut; and sending, by the electronic device, the first image resource in the first color gamut to the large-screen device, the sending comprising synthesizing the first image resource in the first color gamut with the second image resource in the first color gamut and sending a synthesized resource to the large-screen device.

20. The method according to claim 19, further comprising:

displaying, by the electronic device, a second control and a third control, wherein the second control corresponds to the first image resource, and the third control corresponds to the second image resource; and the converting, by the electronic device, the first image resource from the second color gamut to the first color gamut comprises detecting, by the electronic device, a second operation performed on the second control, and in response to the second operation, converting the first image resource from the second color gamut to the first color gamut.

21. The method according to claim 19, wherein the sending, by the electronic device, the first image resource in the first color gamut to the large-screen device comprises:

sending, by the electronic device, the first image resource in the first color gamut and the first color gamut to the large-screen device.

22. The method according to claim 19, wherein the negotiating, by the electronic device, with the large-screen device about a first color gamut over the communication connection comprises:

sending, by the electronic device, a first message to the large-screen device over the communication connection, wherein the first message includes a query regarding a color gamut supported by the large-screen device;

receiving, by the electronic device, a second message sent by the large-screen device, wherein the second message carries the color gamut supported by a large-screen device; and determining, by the electronic device, the first color gamut based on a color gamut supported by the electronic device and the color gamut supported by the large-screen device.

23. The method according to claim 22, further comprising:

sending, by the electronic device, a third message to the large-screen device, wherein the third message carries the first color gamut.

24. The method according to claim 19, wherein:

the sending, by the electronic device, the first image resource in the first color gamut to the large-screen device comprises encoding, by the electronic device, the first image resource in the first color gamut to obtain a transport stream and sending the transport stream to the large-screen device.

* * * * *